United States Patent
Kroeger et al.

(10) Patent No.: US 9,037,103 B2
(45) Date of Patent: May 19, 2015

(54) MRC ANTENNA DIVERSITY FOR FM IBOC DIGITAL SIGNALS

(71) Applicant: iBiquity Digital Corporation, Columbus, MD (US)

(72) Inventors: Brian W. Kroeger, Sykesville, MD (US); Paul J. Peyla, Elkridge, MD (US); Jeffrey S. Baird, Columbia, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 14/296,578

(22) Filed: Jun. 5, 2014

(65) Prior Publication Data

US 2014/0342682 A1    Nov. 20, 2014

Related U.S. Application Data

(62) Division of application No. 13/536,203, filed on Jun. 28, 2012, now Pat. No. 8,831,546.

(60) Provisional application No. 61/556,428, filed on Nov. 7, 2011.

(51) Int. Cl.
*H04B 1/18* (2006.01)
*H04B 7/08* (2006.01)

(52) U.S. Cl.
CPC ............ *H04B 7/0857* (2013.01); *H04B 7/0845* (2013.01); *H04B 7/0885* (2013.01)

(58) Field of Classification Search
CPC .. H04B 7/0882; H04B 7/0885; H04B 7/0845; H04B 7/0857

USPC ........... 455/132, 137, 150.1, 193.1, 313, 323, 455/334; 375/267, 347

See application file for complete search history.

(56) References Cited

U.S. PATENT DOCUMENTS

| | | |
|---|---|---|
| 5,297,171 A | 3/1994 | Koch |
| 5,553,102 A | 9/1996 | Jasper |
| 5,970,104 A | 10/1999 | Zhong |
| 6,128,355 A | 10/2000 | Backman |
| 6,317,470 B1 | 11/2001 | Kroeger |
| 6,345,377 B1 | 2/2002 | Kroeger |
| 6,445,757 B1 | 9/2002 | Raitola |
| 6,549,544 B1 | 4/2003 | Kroeger |
| 6,671,340 B1 | 12/2003 | Kroeger |
| 6,895,060 B2 | 5/2005 | Kroeger |
| 6,982,948 B2 | 1/2006 | Kroeger |
| 7,039,137 B1 | 5/2006 | Lauterjung |
| 7,127,008 B2 | 10/2006 | Kroeger |
| 7,305,056 B2 | 12/2007 | Kroeger |
| 7,319,727 B2 | 1/2008 | Degoulet |
| 7,386,077 B2 | 6/2008 | Alamouti |
| 7,724,850 B2 | 5/2010 | Kroeger |
| 7,933,368 B2 | 4/2011 | Peyla |
| 8,155,610 B2 * | 4/2012 | Elenes .......................... 455/205 |

(Continued)

*Primary Examiner* — Nhan Le
(74) *Attorney, Agent, or Firm* — Robert P. Lenart, Esq.; Pietragallo Gordon Alfano Bosick & Raspanti, LLP

(57) ABSTRACT

A method for processing a radio signal includes: receiving a signal on two antennas; demodulating the signal using first and second independent signal paths that are synchronized by symbol number; maximum ratio combining branch metrics from the two receiver paths; and using the combined branch metrics to produce an output, wherein the receiver paths include an arbitration scheme. A receiver that implements the method is also provided.

16 Claims, 18 Drawing Sheets

(56) References Cited

U.S. PATENT DOCUMENTS

| | | |
|---|---|---|
| 2006/0146693 A1 | 7/2006 | Mori et al. |
| 2006/0291600 A1 | 12/2006 | Tsai |
| 2008/0098439 A1* | 4/2008 | Taura et al. ............... 725/75 |
| 2009/0079656 A1 | 3/2009 | Peyla |
| 2012/0063553 A1 | 3/2012 | Carwana et al. |
| 2012/0321012 A1 | 12/2012 | Elenes et al. |
| 2012/0328057 A1 | 12/2012 | Kroeger et al. |
| 2013/0029585 A1 | 1/2013 | Kroeger et al. |

* cited by examiner

Branch Metric Scaling & Quantization

MRC ANTENNA DIVERSITY FOR FM IBOC DIGITAL SIGNALS

CROSS REFERENCE TO RELATED APPLICATIONS

This application is a divisional application of U.S. patent application Ser. No. 13/536,203, filed Jun. 28, 2012, and titled "MRC Antenna Diversity For FM IBOC Digital Signals", which claims the benefit of U.S. Provisional Patent Application No. 61/556,428, filed Nov. 7, 2011. Both of these applications are hereby incorporated by reference.

BACKGROUND iBiquity Digital Corporation's HD Radio™ system is designed to permit a smooth evolution from current analog amplitude modulation (AM) and frequency modulation (FM) radio to a fully digital in-band on-channel (IBOC) system. This system delivers digital audio and data services to mobile, portable, and fixed receivers from terrestrial transmitters in the existing medium frequency (MF) and very high frequency (VHF) radio bands. Broadcasters may continue to transmit analog AM and FM simultaneously with the new, higher-quality and more robust digital signals, allowing themselves and their listeners to convert from analog to digital radio while maintaining their current frequency allocations. Examples of waveforms for an FM HD Radio system are shown in U.S. Pat. No. 7,724,850, which is hereby incorporated by reference.

A variety of antenna diversity techniques have been developed and deployed for use with automotive FM receivers. They are used to mitigate the effects of distortion and outages due to multipath propagation of the received FM signal, and can also accommodate the directional characteristics of glass-embedded window antennas. All diversity techniques use two or more antenna elements, and some require multiple tuners/receivers. Some techniques can be applied to digital signals, and some cannot.

Blind diversity switching can be economically attractive because a simple multi-position switch connects the selected antenna element to only one tuner and receiver. However, because the switching is blind, there is no guarantee that the next antenna element will carry a better signal, and subsequent switching may occur in rapid succession until a good signal is found. Furthermore, since the digital signal is coherently detected and tracked, each antenna switching event is likely to cause symbol corruption and temporary loss in channel state information (CSI) and coherent tracking.

Such switching transients can be avoided by using a smooth diversity combining algorithm. These techniques involve some kind of multiple-input signal combining (pre or post-detection), and require multiple tuners. One combining method for analog FM signals employs phase diversity using a constant-modulus algorithm (CMA). However, this approach is not valid for HD Radio signals as the digital sidebands are not characterized by a constant envelope.

IBOC HD Radio receivers can be used in combination with switch diversity antenna systems. However the use of switch diversity antennas introduces abrupt transients in the coherent tracking of the digital signal, which degrades digital performance.

SUMMARY

In one aspect, the invention provides a method for processing a radio signal. The method includes receiving a signal on two antennas; demodulating the signal using two independent signal paths that are synchronized by symbol number; maximum ratio combining branch metrics from the two signal paths; and using the combined metrics to produce an output, wherein the receiver paths include an arbitration scheme.

In another aspect, the invention provides a receiver including first and second inputs configured to receive a signal on two antennas; first and second demodulators for demodulating the signal in first and second independent signal paths that are synchronized by symbol number; and circuitry for maximum ratio combining branch metrics from the two signal paths, and using the combined metrics to produce an output, wherein the signal paths include an arbitration scheme.

DETAILED DESCRIPTION

Maximum Ratio Combining (MRC) of Viterbi Branch Metrics (VBMs) can afford improved signal to noise ratio (SNR) performance, at the cost of adding a second digital reception path (from tuner to baseband). An MRC receiver is intended to operate at lower SNRs than a single receiver, and the acquisition and tracking algorithms designed for a single receiver may not operate effectively at these lower SNRs, compared to a single demodulator. Furthermore, if one of the demodulators is outputting corrupted Viterbi Branch Metrics (due to a poor antenna signal) while the other demodulator is correctly demodulating, then contamination is possible, which degrades combined performance.

Various techniques for implementing Maximum Ratio Combining in an antenna diversity system are described herein. Such techniques are applicable to processing of an OFDM signal of an HD Radio FM IBOC radio system. In the embodiments described herein, MRC involves the combining of Viterbi Branch Metrics (derived from the demodulated symbols) from two (or possibly more) diversity receiver paths, also referred to herein as signal paths. Each of these receiver paths includes a tuner configured to receive a signal from a diversity antenna element, an OFDM demodulator, and Viterbi Branch Metric computation for each receiver output symbol (code bit). The combining or adding of the Viterbi Branch Metrics is the MRC function. The combined Viterbi Branch Metrics can then be deinterleaved, decoded and processed as in the subsequent functions of a conventional single receiver. Existing HD Radio receivers already compute appropriate branch metrics, including signal equalization and noise normalization, which can be used as described herein.

Figure 1:
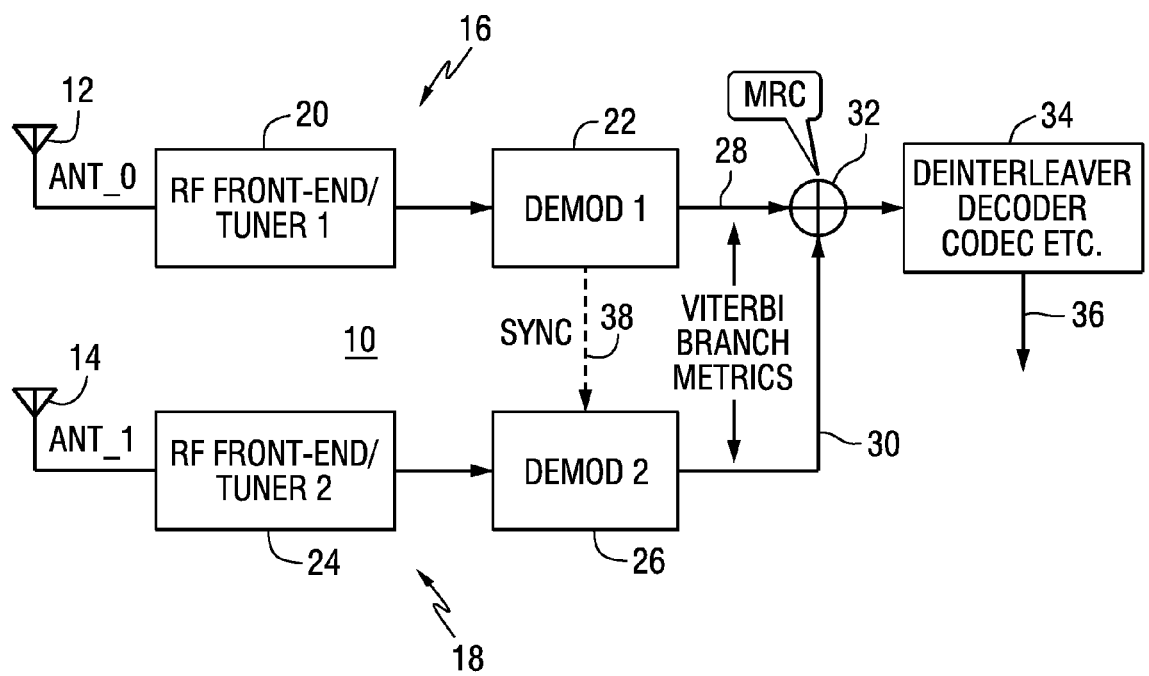
FIG. 1 is a high-level Maximum Ratio Combining (MRC) block diagram.

Assuming independent fading at each antenna element, MRC combines branch metrics from two different receiver paths to minimize receiver bit error rate (BER). Branch metrics are effectively a measure of the signal-to-noise (energy) ratio of each demodulated symbol at the input to a Viterbi decoder. The MRC algorithm sums corresponding, synchronized Viterbi Branch Metrics from two receiver channels prior to deinterleaving and Viterbi decoding. FIG. 1 is a block diagram of portions of a receiver 10 connected to two antennas 12, 14. The receiver includes two signal paths 16, 18 (also called receiver paths or channels). The first signal path 16 includes a first radio frequency front end/tuner 20 and a first demodulator 22. The second signal path 18 includes a second radio frequency front end/tuner 24 and a second demodulator 26. The antennas are configured to receive an in-band, on-channel (IBOC) radio signal, which can be an FM HD Radio signal. HD Radio signals are described in, for example, U.S. Pat. No. 7,933,368, which is hereby incorporated by reference. Each signal path includes processing circuitry or a processor programmed to compute Viterbi Branch Metrics for each receiver output symbol. In the example of FIG. 1, such processing circuitry or a processor can be included in the demodulator blocks.

The antennas can be elements with different characteristics, positioned at different locations, and/or positioned at different orientations. The demodulators produce Viterbi Branch Metrics on lines 28 and 30. These Viterbi Branch Metrics are maximum ratio combined in combiner 32. The combined metrics are then passed to circuitry 34 that processes the combined metrics to produce an output signal on line 36. This processing circuitry may include a deinterleaver, decoder, codec, etc. as is known in the art.

MRC is attained by adding the corresponding Viterbi Branch Metrics of the demodulated symbols (bits before decoding) from the two receiver paths. Corresponding VBMs from the two receiver paths can be synchronized, as shown by line 38, by indexing prior to the deinterleaver. The indexing is used to unambiguously identify and label (number) the symbols in the interleaver matrix. Like-indexed VBMs are added when the corresponding symbols are available from both receiver paths. The embodiment of FIG. 1 uses two independent receiver/demods, then identifies and combines like-indexed symbol Viterbi Branch Metrics. The indexing allows the two receiver paths to operate asynchronously.

When one of the receiver paths has no VBMs available, the missing VBMs are assumed to be zero, and only the receiver path with valid VBMs is used (no addition is necessary). When VBMs are not available from either receiver, the downstream functions (deinterleaver, Viterbi decoder, etc.) are reset, assuming for example, a reacquisition process is invoked.

A baseline MRC technique assumes that each receiver path is configured to independently acquire and track the signal, and that the branch metrics are aligned and combined. In one case, performance is near optimum when both receivers are tracking the signal with proper synchronization. The main performance enhancement is achieved in dynamic fading conditions. When one antenna is in a deep fade, the other antenna may not be faded, and vice versa. Symbol and frequency tracking for each receiver path can flywheel over short fades or outages. The flywheeling maintains adequate synchronization during brief signal outages.

Analog FM phase diversity can be implemented using two antennas, two tuners, and two FM receiver paths. A pair of signals can be combined prior to the FM demodulator using a Constant Modulus Algorithm (CMA), or some variation thereof. Since two antenna signal paths are available, these phase diversity systems are compatible with MRC for IBOC digital diversity.

Figure 2:
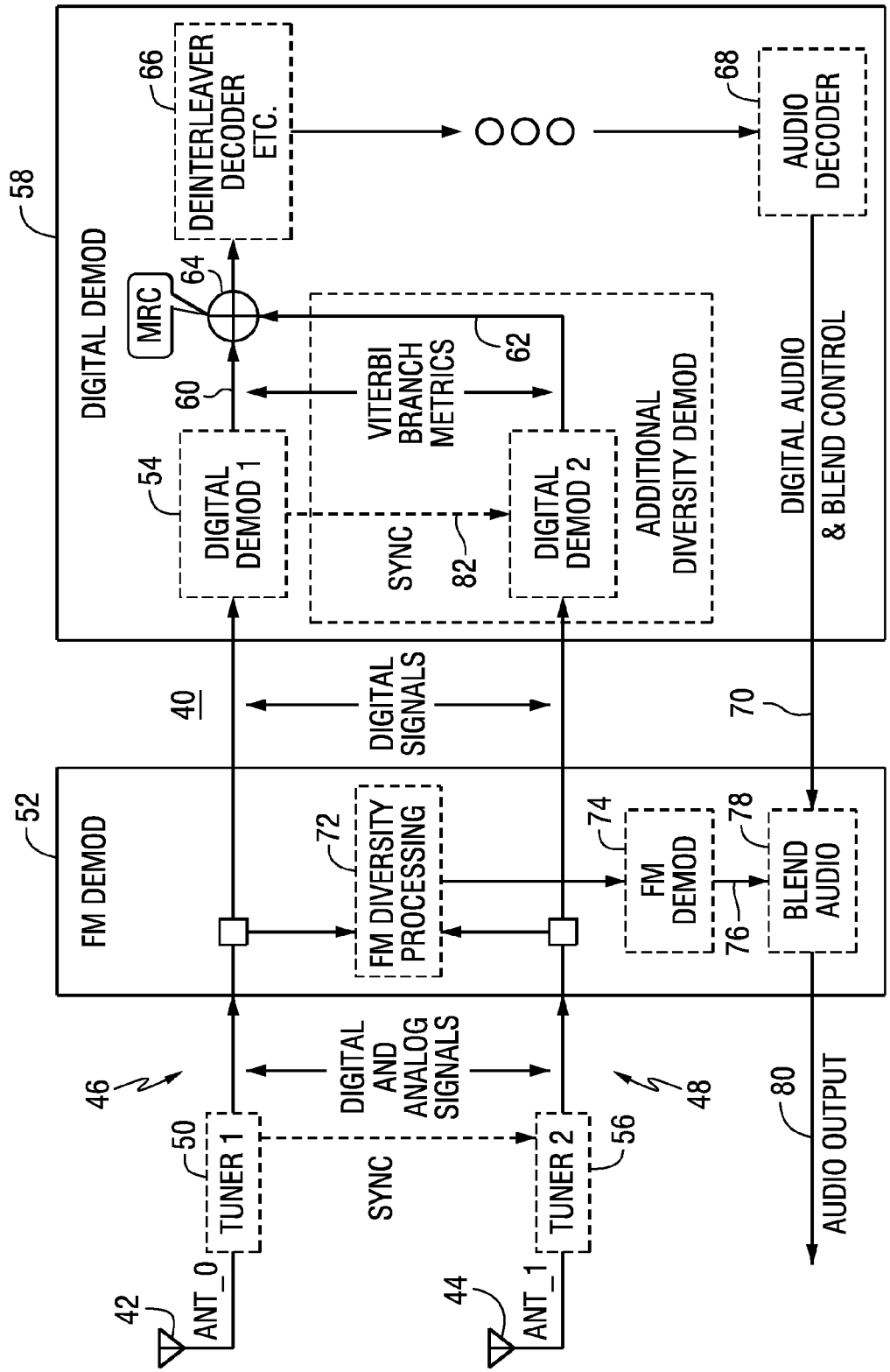
FIG. 2 is a functional block diagram of a receiver configured to include FM phase diversity and digital MRC.

FIG. 2 shows a functional block diagram of an implementation of digital MRC in a vehicle application that also employs analog FM phase diversity. FIG. 2 is a block diagram of a receiver 40 connected to two antennas 42, 44. The receiver includes two signal paths 46, 48. The first signal path 46 includes a first radio frequency front end/tuner 50, an analog FM demodulator 52 and a first digital demodulator 54. The second signal path 48 includes a second radio frequency front end/tuner 56, the analog FM demodulator 52 and a second digital demodulator 58. The antennas are configured to receive an in-band, on-channel radio signal, which can be an FM HD Radio signal. The antennas can be elements with different characteristics, positioned at different locations, and/or positioned at different orientations. The demodulators produce Viterbi Branch Metrics on lines 60 and 62. These VBMs are maximum ratio combined in combiner 64. The combined metrics are then passed to circuitry 66 that processes the combined metrics. This processing circuitry may include a deinterleaver, decoder, codec, etc. as is known in the art. An audio decoder 68 produces digital audio and blend control signals as illustrated by line 70. The analog FM demodulator 52 includes FM diversity processing 72 and FM demodulation 74 to produce a demodulated FM signal on line 76. A blend control 78 blends the demodulated FM signal on line 76 and the digital audio signal to produce an audio output on line 80. Each receiver path is configured to calculate the branch metrics and to independently acquire and track the signal, and ensure that the branch metrics are aligned and combined.

MRC is attained by adding the corresponding VBMs of the demodulated symbols (bits before decoding) from the two receiver paths. Corresponding VBMs from the two receiver paths can be synchronized, as shown by line 82, by indexing prior to the deinterleaver.

Figure 3:
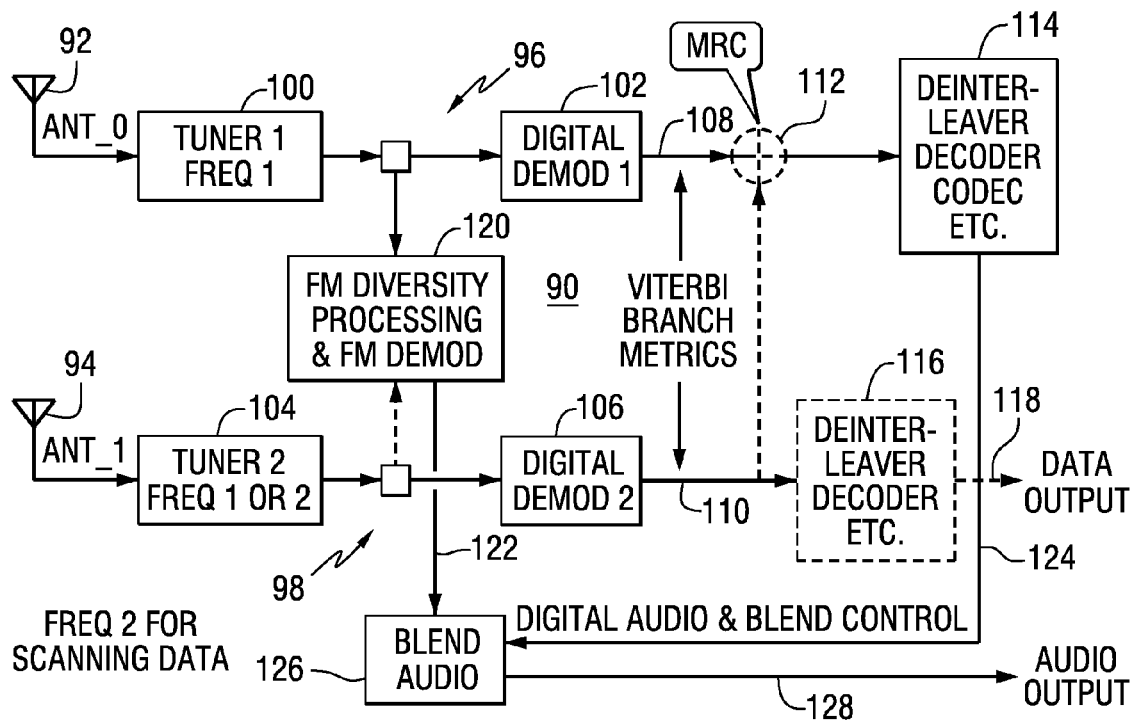
FIG. 3 is a functional block diagram of a receiver configured to include either diversity (MRC and FM phase diversity) or a data scanning receiver.
Figure 4:
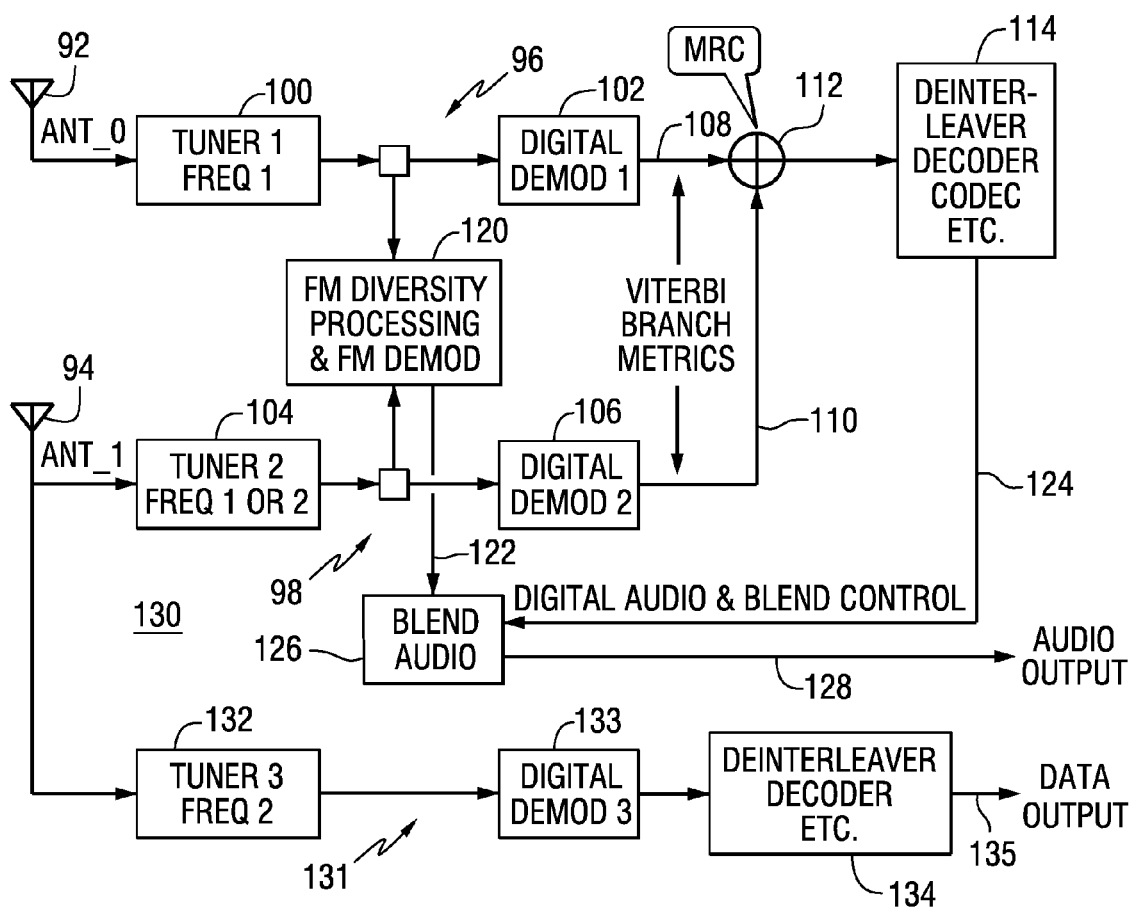
FIG. 4 is a functional block diagram of a receiver configured to include both diversity (MRC and FM phase diversity) and a data scanning receiver.
Figure 5:
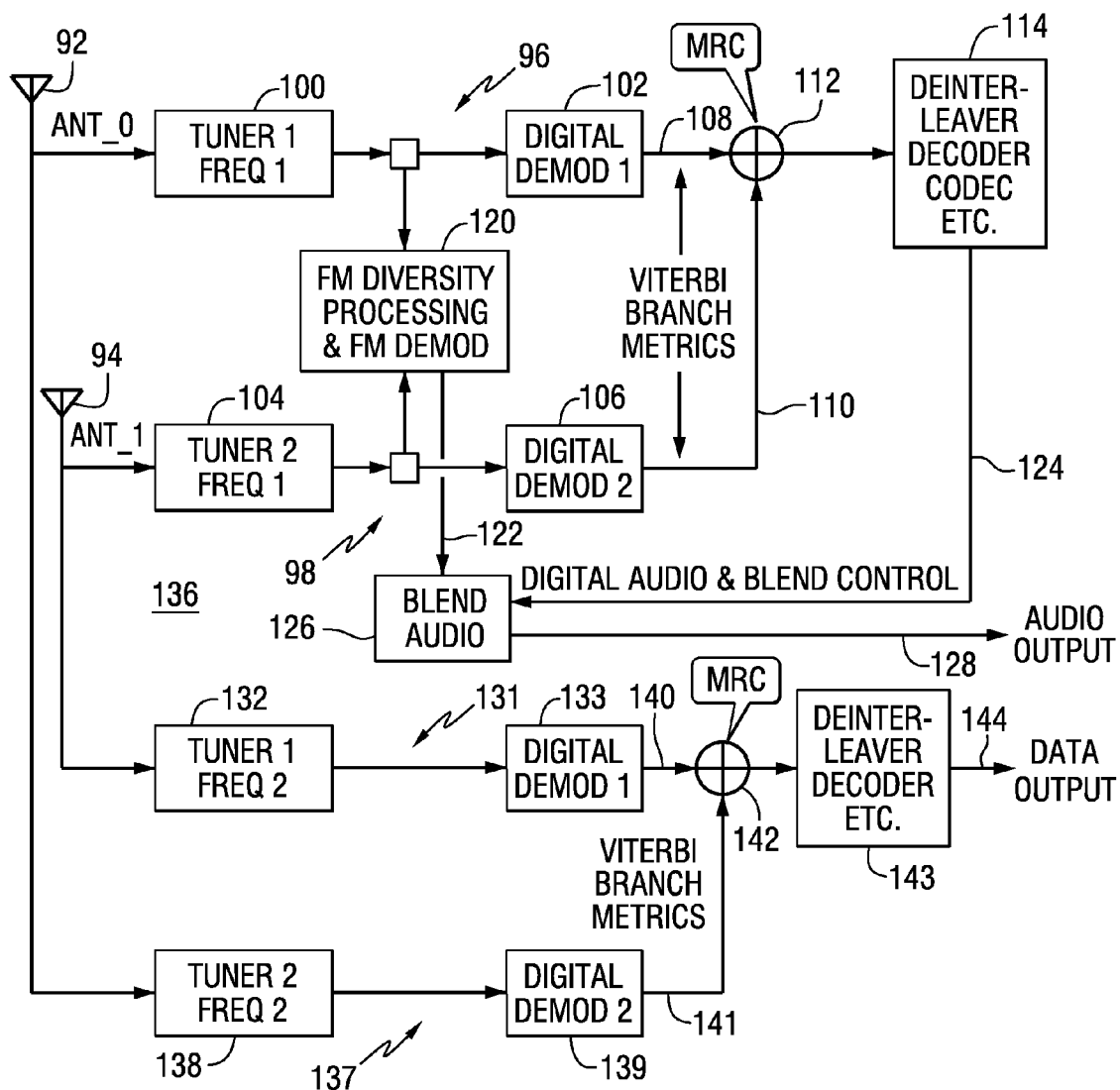
FIG. 5 is a functional block diagram of a receiver configured to include both diversity (MRC and FM phase diversity) and a data scanning receiver, also with MRC.

FIGS. 3 through 5 show several implementation options for including MRC in a data scanning receiver. FIG. 3 shows how a receiver 90 with two antenna signal paths can be configured to use the second antenna signal path for either MRC and phase diversity, or for a non-MRC scanning data channel, but not both simultaneously. The receiver 90 is connected to two antennas 92, 94. The receiver includes two signal paths 96, 98. The first signal path 96 includes a first radio frequency front end/tuner 100 that can be tuned to a first frequency, and a first digital demodulator 102. The second signal path 98 includes a second radio frequency front end/tuner 104 that can be tuned to either the first frequency or a second frequency, and a second digital demodulator 106. The antennas are configured to receive an in-band, on-channel radio signal, which can be an FM HD Radio signal. The antennas can be elements with different characteristics, positioned at different locations, and/or positioned at different orientations. The demodulators produce Viterbi Branch Metrics on lines 108 and 110. These VBMs can be maximum ratio combined in combiner 112. The combined metrics are then passed to circuitry 114 that processes the combined metrics to produce an output signal. This processing circuitry may include a deinterleaver, decoder, codec, etc. as is known in the art. Alternatively, instead of MRC, additional processing circuitry 116 can be provided to process the output from the second digital demodulator to produce a data output on line 118. The tuner outputs are subject to FM diversity processing and/or analog FM demodulation as shown in block 120 to produce an analog audio signal on line 122. The analog FM audio signal and a digital audio signal on line 124 are blended as shown in block 126 to produce an audio output on line 128. Each receiver path is configured to calculate the branch metrics and to independently acquire and track the signal, and ensure that the branch metrics are aligned and combined.

FIG. 4 is a block diagram of a receiver 130 that includes many of the elements of FIG. 3 and adds a third signal path 131. The third signal path includes a third tuner 132 and a third digital demodulator 133 to enable both MRC and phase diversity as well as a non-MRC data scanning channel. The output of the third digital demodulator is processed by processing circuitry 134 to produce a data output on line 135. In this example, two of the three tuners are tuned to the same frequency.

FIG. 5 is a block diagram of a receiver 136 that includes many of the elements of FIG. 4 and adds a fourth signal path 137. The fourth signal path includes a fourth tuner 138 and a fourth digital demodulator 139 to enable MRC on both the main receiver signal as well as the scanning data path. The Viterbi branch metric outputs of the third and fourth digital demodulators on lines 140 and 141 are combined in combiner 142. Then the combined signal is processed by processing circuitry 143 to produce a data output on line 144. In this example, both the first and second tuners are tuned to a first frequency, and both the third and fourth tuners are tuned to a second frequency.

I. Viterbi Branch Metrics

The Viterbi Branch Metrics (VBMs) for the described IBOC MRC embodiments are a ratio of the estimated signal to noise energy of the channel symbols (bits) prior to deinterleaving and decoding. These VBMs can be computed as described in U.S. Pat. Nos. 6,982,948, 7,305,056 or 7,724,850, which are hereby incorporated by reference. The first two patents (U.S. Pat. Nos. 6,982,948 and 7,305,056) use linear filters to estimate Channel State Information (CSI).

Figure 6:
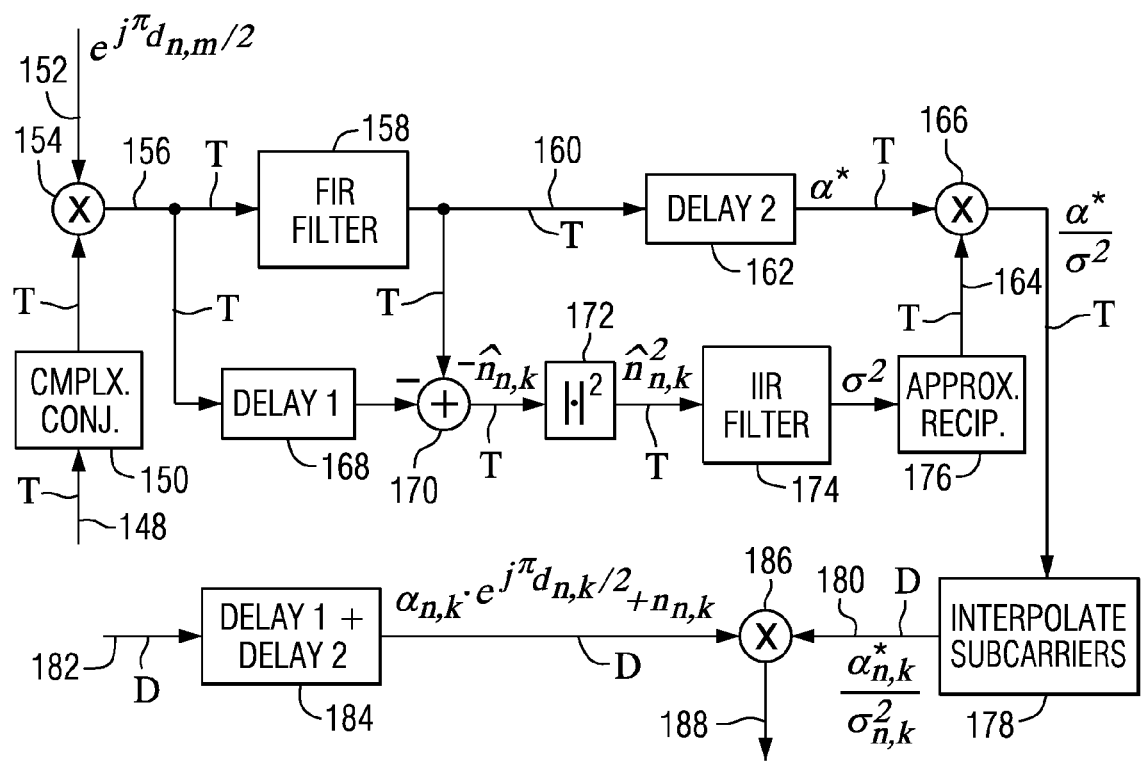
FIG. 6 is a functional block diagram showing a computation for Viterbi Branch Metrics.

As shown in U.S. Pat. No. 7,305,056, an HD Radio signal includes an analog modulated carrier and a plurality of digitally modulated subcarriers. Some of the digitally modulated subcarriers are reference subcarriers. FIG. 6 is a functional block diagram describing the CSI estimation using linear filters as shown in U.S. Pat. No. 7,305,056. FIG. 6 illustrates a method of estimating both the phase reference and the CSI from the reference subcarriers in an HD Radio signal. The reference subcarriers can be used for acquisition, tracking, estimation of CSI and coherent operation.

As shown in FIG. 6, the complex training symbols carried by the reference subcarriers are input on line 148 and the complex conjugate of the symbols is taken as shown in block 150. The complex conjugate is multiplied with a known training sequence on line 152 by multiplier 154. This removes the binary (±1) timing sequence modulation from the received training subcarriers by multiplying them by the synchronized, decoded, and differentially-reencoded BPSK timing sequence. The resulting symbols on line 156 are processed by a finite impulse response (FIR) filter 158 to smooth the resulting symbols over time, yielding a complex conjugated estimate of the local phase and amplitude on line 160. This value is delayed by time delay 162 and multiplied by an estimate of the reciprocal of the noise variance on line 164 by multiplier 166. The noise variance is estimated by subtracting the smoothed estimate of the local phase and amplitude on line 160 from the input symbols (after appropriate time alignment provided by delay 168) at summation point 170. Then squaring the result as shown in block 172, and filtering the complex noise samples as illustrated in block 174. The reciprocal is approximated (with divide-by-zero protection) as shown in block 176. This CSI weight is interpolated over the 18 subcarriers between pairs of adjacent training subcarriers as illustrated by block 178 to produce resulting local CSI weights on line 180. The CSI weights are then used to multiply the corresponding local data-bearing symbols received on line 182, after they have been appropriately delayed as shown in block 184. Multiplier 186 then produces the soft decision output on line 188.

In FIG. 6, lines carrying training symbols are labeled T and lines carrying data are labeled D. In addition, filter 174 includes a delay of:

$$\text{delay} \geq \frac{1}{\beta},$$

where $\beta = \frac{1}{16}$ and, $$y_{n,m} = 2 \cdot (1-\beta) \cdot y_{n-1,m} - (1-\beta)^2 \cdot y_{n-2,m} + \beta^2 \cdot x_{n,m}.$$

These expressions relate to a 2-pole IIR filter with a time constant β. The IIR filter computes smoothed output samples "y" from input sample "x" and previous output samples.

The CSI weight combines the amplitude weighting for maximum ratio combining along with a phase correction for channel phase errors. This CSI weight is dynamic over time and frequency, and is estimated for each QPSK symbol.

$$CSIweight = \frac{\alpha^*}{\sigma^2},$$

where α* is an estimate of the complex conjugate of the channel gain and σ² is an estimate of the variance of the noise.

The operation of the CSI recovery technique of FIG. 6 assumes acquisition and tracking of the frequency of the subcarriers, and the symbol timing of the OFDM symbols. The frequency and symbol timing acquisition techniques exploit properties of the cyclic prefix. The frequency and symbol tracking is accomplished through observation of the phase drift from symbol to symbol over time or frequency (across subcarriers).

After acquisition of both frequency and symbol timing, synchronization to the Block Sync pattern of the BPSK Timing Sequence is attempted by cross-correlating the differentially detected BPSK sequence with the Block Sync pattern. The differential detection is performed over all subcarriers assuming that the location of the training subcarriers is initially unknown. A cross-correlation of the known Block Sync pattern with the detected bits of each subcarrier is performed. A subcarrier correlation is declared when a match of all 11 bits of the Block Sync pattern is detected. Block synchronization (and subcarrier ambiguity resolution) is established when the number of subcarrier correlations meets or exceeds the threshold criteria (e.g., 4 subcarrier correlations spaced a multiple of 19 subcarriers apart).

After Block Sync is established the variable fields in the BPSK Timing Sequence can be decoded. The differentially detected bits of these variable fields are decided on a "majority vote" basis across the training subcarriers such that decoding is possible when some of these subcarriers or bits are corrupted. The 16 Blocks within each Modem Frame are numbered sequentially from 0 to 15. Then the most significant bit (MSB) of the Block Count field is always set to zero since the Block Count never exceeds 15. Modem Frame synchronization is established with knowledge of the Block Count field.

The coherent detection of this signal requires a coherent phase reference. The decoded information from the BPSK Timing Sequence is used to remove the modulation from the training subcarriers leaving information about the local phase reference and noise. Referring to FIG. 6, the binary ($\pm 1$) timing sequence modulation is first removed from the received training subcarriers by multiplying them by the synchronized, decoded, and differentially-reencoded BPSK Timing Sequence. A FIR filter is used to smooth the resulting symbols over time, yielding a complex conjugated estimate of the local phase and amplitude. This value is delayed and multiplied by an estimate of the reciprocal of the noise variance. The noise variance is estimated by subtracting the smoothed estimate of the local phase and amplitude from the input symbols (after appropriate time alignment), squaring and filtering the complex noise samples, then approximating the reciprocal (with divide-by-zero protection). This CSI weight is interpolated over the 18 subcarriers between pairs of adjacent training subcarriers. The resulting local CSI weights are then used to multiply the corresponding local data-bearing symbols.

In one embodiment, the low pass filter 158 in FIG. 6 is an 11-tap FIR filter. The 11-tap FIR filter is used to dynamically estimate the complex coherent reference gain $\alpha$ at each reference subcarrier location for each symbol time. The filtering over time with the 11-tap FIR filter, and subsequent filtering across subcarriers is performed to compute a local estimate of the coherent reference gain $\alpha$ for each QPSK symbol location over both time and frequency. A larger FIR filter with more taps would reduce the estimation error when the signal statistics are stationary, but the bandwidth would be too small to track Doppler-induced changes in the signal at maximum highway speeds. Therefore 11 taps with a tapered symmetric Gaussian-like impulse response was considered to be appropriate. A symmetric FIR is used instead of an IIR filter for its linear phase property which has zero bias error for a piecewise linear (approximately) channel fading characteristic over the span of the filter. This smoothed coherent reference signal output of the FIR filter is subtracted from the delayed input samples to yield the instantaneous noise samples. These noise samples are squared and processed by an IIR filter 174 to yield an estimate of the noise variance $\sigma^2$. This filter has a narrower bandwidth than the FIR filter to yield a generally more accurate estimate of the noise variance. After appropriate sample delays to match the filter delays, the symbol weight $\alpha^*/\sigma^2$ is computed for each subcarrier. These values are smoothed and interpolated across the subcarriers for each OFDM symbol to yield more accurate estimates. This weight is unique for each OFDM symbol and each subcarrier providing a local (time and frequency) estimate and weight for the symbols forming the branch metrics for a subsequent Viterbi decoder.

As used herein, the "complex coherent reference gain ($\alpha$)" of a QPSK symbol (depending on time/frequency location since it is dynamic) is defined as $\alpha$. It is a complex term, including real and imaginary components, that represents the gain and phase of the symbol associated with it. This value is estimated by the processing and filtering described. The "composite coherent channel reference signal $x_n$" is the composite value of $\alpha$ computed over all the reference subcarriers over any one OFDM symbol time.

The multiple roles of the Reference Subcarriers for acquisition, tracking, estimation of channel state information (CSI) and coherent operation have been described in the incorporated patents. The system of U.S. Pat. No. 7,305,056 was designed to accommodate vehicles with fixed antennas. The system was designed for coherent operation in the FM broadcast band (88-108 MHz) with fading bandwidth to accommodate vehicles at highway speeds. The various coherent tracking parameters are estimated using filters with bandwidths that approximate the maximum expected Doppler bandwidth (roughly 13 Hz). With a fixed antenna, the pertinent tracking statistics of the input signal to the tracking algorithms are assumed to vary at a rate no greater than the Doppler bandwidth.

As used herein, the "complex coherent reference gain ($\alpha$)" of a QPSK symbol (depending on time/frequency location since it is dynamic) is defined as $\alpha$. It is a complex term, including real and imaginary components, that represents the gain and phase of the symbol associated with it. This value is estimated by the processing and filtering described. The "composite coherent channel reference signal $x_n$" is the composite value of $\alpha$ computed over all the reference subcarriers over any one OFDM symbol time.

The third patent (U.S. Pat. No. 7,724,850) uses nonlinear filters to estimate CSI. The nonlinear filters improve performance in the presence of impulse noise and step transients. Step transients can be caused by stepped agc or by switching antenna diversity systems. This patent is listed below, and a functional block diagram is shown in FIG. 7.

Figure 7:
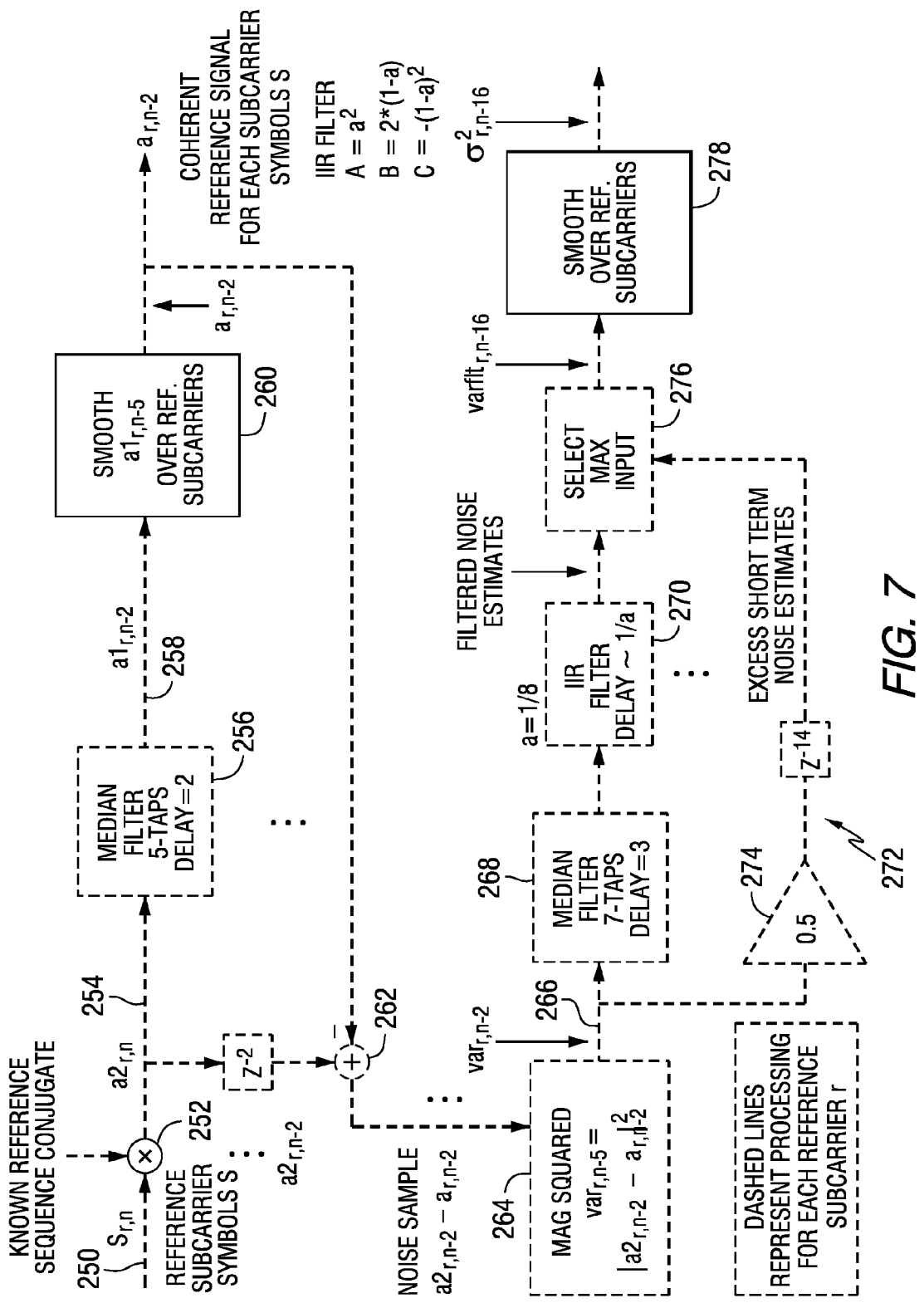
FIG. 7 is a functional block diagram showing a computation for Viterbi Branch Metrics.

FIG. 7 shows an example wherein the 11-tap FIR filter is replaced with a 5-tap median filter. The goal of the process(es) shown here is to provide estimates of the coherent channel complex gain ("a" values) along with estimates of the noise or interference. These estimates are local in time and frequency (subcarrier location) to accommodate the dynamic selective fading channel experience in a mobile environment such as a moving automobile. These estimates are derived from the reference subcarrier symbols which have been stripped from the received and demodulated signal as previously described, and are input on line 250 as $S_{r,n}$ complex values. The data used to modulate these symbols is already known and removed from these symbols with the first conjugate multiply operation (illustrated by multiplier 252) to yield the instantaneous complex channel gain values $a2_{r,n}$ on line 254. The subsequent median filtering 256 in time reduces the noise while maintaining the step changes due to antenna switching to produce intermediate values $a1_{r,n}$ on line 258. These intermediate values are further filtered (smoothed) over the reference subcarriers (in frequency) as shown in block 260 to produce the final complex channel gain values $a_{r,n}$. These $a_{r,n}$ gain values are later used outside this algorithm to process (equalize and provide branch metric information) the signal constellations for the data bearing symbols in the conventional manner for QAM symbol demodulation.

The next step in this process is to estimate the noise associated with each of these complex channel gain values. The instantaneous noise samples are estimated by subtracting the $a_{r,n-2}$ values from the (appropriately delayed) noisy corresponding input samples $a2_{r,n-2}$, as illustrated by summation point 262. As shown in block 264, the magnitude-squared value is computed from these complex noise samples to yield the instantaneous noise variance estimates $var_{n-2}$ on line 266. These instantaneous noise variance samples are poor estimates of the local (time and frequency) noise and require processing and filtering to produce useful noise variance estimates. Although simpler time and frequency filtering would normally be used to reduce the error of these instantaneous noise variance estimates, this type of filtering would not effectively accommodate the changing noise due to fading, Automatic Gain Control AGC action and step changes due to antenna switching. Therefore a median filter 268 is used to filter these instantaneous variance samples in time to produce samples $varflt_{n-16}$, and conventional (linear IIR or FIR filter 270) filtering is used to further smooth across frequency (subcarriers) to produce the final variance estimates $\sigma_{r,n-16}$ in a manner similar to the complex channel gain estimates above. An additional feed forward path 272 is provided to capture the relatively large noise impulses that occur due to the antenna switching. When these values (scaled by a factor 0.5 as shown in block 274) exceed the median-filtered estimate, then these larger values are selected for output to the frequency smoothing filter by the select max function illustrated in block 276. These values are then smoothed over the reference subcarriers as shown in block 278. This is important in subsequent formation of the branch metrics which exploits this knowledge of the large noise impulses.

Analyses and simulation of the algorithm improvements to the coherent reference estimation just described appear to work sufficiently well for the cases analyzed and simulated. These cases include a flat and selective fading channel with Doppler bandwidth consistent with highway speeds and noise as low as 0 dB SNR. However other channel conditions should be considered, such as impulsive noise, or residual transient effects not entirely suppressed by the new coherent reference processing. In this case the adjusted coherent reference values of x are appropriate; however, the noise variance estimate would be corrupted. The noise impulse could be high for the symbol(s) where the impulse occurred, but the IIR filter would suppress this noise estimate value at the impulse instant, and spread the noise estimate over the impulse response time of the IIR filter. It would be preferable in this case to feed-forward the high noise samples in parallel with the IIR path (with appropriate delay matching). For symbols where the noise pulse is sufficiently higher than the IIR filter output, this noise pulse should be used to determine the estimated noise variance for those symbols. When the feed-forward path is used for these noise pulses, the energy into the IIR filter for these samples should be reduced so that the local noise peak is not spread over the span of the IIR filter. It is easy to consider several variations of this process for handling noise peaks in the noise variance estimate.

The noise variance estimation process is modified to improve performance with switching transients and to accommodate a faster AGC. The original noise estimation employed a 2-pole IIR filter with parameter $a=\frac{1}{16}$ (not to be confused with the subscripted "$a_{r,n}$" value notations for the complex channel gains). The peak of the impulse response of this filter was at a delay of 8 samples (symbols), although the decaying tail was much longer making the step delay closer to 16 samples (symbols).

The functions described in FIGS. 6 and 7 can be performed, for example, in the digital demodulator blocks of FIGS. 1-5.

According to embodiments of the invention, these branch metrics can be modified as described below in order to optimize their use in maximum ratio combining for an FM IBOC diversity system, including adjusting for non-linear filtering effects, warping, quantization, and synchronization, as described in the following sections.

Analysis of Viterbi Branch Metrics

The relationship between carrier-to-noise ratio Cd/No and the VBM values is analyzed in this section, as this relationship influences the modifications described in subsequent sections. The VBMs are formed by multiplying the received symbols by the computed CSIweight. These channel state information (CSI) weights are derived from the reference subcarriers and interpolated over the 18 data-bearing subcarriers between the neighboring pairs of reference subcarriers. This CSIweight combines the amplitude weighting for MRC along with a phase correction for channel phase errors.

$$CSIweight = \frac{\alpha^*}{\sigma^2}$$

where a* is the complex conjugate of the estimated channel gain, relative to a quadrature phase shift keying (QPSK) symbol energy of one, and $\sigma^2$ is an estimate of the variance of the noise for a QPSK symbol. Since the noise variance is estimated in two dimensions for the QPSK symbol, then $\sigma^2$=No (instead of $\sigma^2$=No/2 usually associated with a one-dimensional matched filter). The QPSK symbol has a nominal magnitude of $|a|=\sqrt{Es}=\sqrt{2 \cdot Ec}$, where Es is the energy of a QPSK symbol, and Ec is the energy of one of the two code bits of the QPSK symbol. When a received bit is multiplied by the CSI weight, it has a typical (absolute) value of $$|BM| = \left| \sqrt{Ec} \cdot \frac{a^*}{\sigma^2} \right| = \sqrt{2} \cdot \frac{Ec}{No}$$

The code bit energy Ec is expressed as a function of the total digital signal power Cd.

$$Ec = \frac{Cd}{344.53125 \cdot 191 \cdot 4}$$

Then the typical (absolute) value of the branch metrics can be expressed as a function of Cd/No.

$$|VBM| = \frac{Cd}{No} \cdot \frac{\sqrt{2}}{344.53125 \cdot 191 \cdot 4} = Cd/No - 52.7 \text{ dB}$$

Adjustments for Nonlinear Filtering

The branch metric analysis described above assumes ideal linear filtering. However, current HD Radio receiver implementations employ several nonlinear filtering techniques to mitigate the undesirable effects of impulsive noise and step transients due to automatic gain control (AGC) and/or switched diversity antenna systems, as is described in U.S. Pat. No. 7,724,850, which is hereby incorporated by reference. The branch metric relationship with Cd/No can be adjusted to allow for gain difference with these nonlinear filters. As shown above, the typical branch metric relationship for the ideal linear filter model is $$|VBM|=Cd/No-52.7 \text{ dB}$$

A functional block diagram of the CSI estimate technique using nonlinear filtering is shown in FIG. 7. The top signal path in FIG. 7 shows a 5-tap median filter. This filters the complex QPSK (constrained to BPSK) symbols of the reference subcarriers that have been stripped of data. The symbol values represent the complex channel gain for each reference subcarrier. The median filter in this case does not impose a bias relative to the weighted complex sample mean that would be obtained by linear filtering in the case of all-white Gaussian noise (AWGN). This is because the two-dimensional Gaussian noise probability density function is symmetric about the mean complex value of the QPSK symbol.

The 7-tap median filter for the noise variance estimate produces a bias relative to a linear averaging filter. This is because the squared error samples have a nonsymmetric distribution about the mean. Specifically the sum of the square of the pair of unit variance Gaussian samples produces a Chi-squared ($\sigma^2$) distribution with 2 degrees of freedom, having a mean of 2 (2 dimensions) and a distribution of $$CDF(x) = 1 - e^{-x/2}; PDF(x) = \frac{1}{2} \cdot e^{-x/2}.$$

The variance of the noise is the mean of the Chi-squared distribution.

$$\sigma^2 = \int_0^\infty x \cdot PDF(x) \cdot dx = 2.$$

The nonlinear filter in the receiver implementation approximates the variance with the median of the Chi-squared distribution, and is solved by $$\int_0^{median} PDF(x) \cdot dx = \int_{median}^\infty PDF(x) \cdot dx;$$
$$median = 2 \cdot \ln(1/2) \cong 1.386.$$

The median value of 1.386 is relative to a linear mean of 2, yielding a gain of ln(2)=0.693 instead of unity gain expected of a linear filter. However, the median of a finite number of samples (e.g., 7) is biased slightly higher than the true median of a large sample set. A simple simulation of a sliding 7-tap median filter over 1 million Chi-squared samples reveals that the gain is approximately 0.76 (instead of unity gain for linear filters), underestimating the noise variance by 1.2 dB. This is due to the asymmetry of the distribution of the square of the Gaussian complex samples. Then this will tend to overestimate the CSIweight by a factor of about 1.316 (1.2 dB).

There is another filter nonlinearity due to the excess short term noise estimates. In this case large impulsive noise samples (scaled by 0.5) will be selected as the noise-squared filter output. The result is that the feedforward peak excess short term noise estimates will overestimate the noise. The net result of both nonlinearities (7-tap median filter, and select max) is that the noise variance is underestimated by a factor of 0.83 (0.8 dB), so the CSIweight is overestimated by a factor of 1.2.

Simulation results of an actual receiver show the mean branch metric values as a function of Cd/No. The results show that the simulated branch metrics are a factor of 1.073 (0.3 dB error) greater than the predicted values at typical Cd/No operating points, even after correction for nonlinear filtering. One explanation why the VBMs are larger than predicted is that the finite symbol estimation (e.g., 5-tap median filter) is influenced by the nonzero median of the noise over those 5 samples. The symbol magnitude would be overestimated (although not biased) at the median filter output because of the vector addition of the noise component. This would also result in underestimation of the noise variance because the symbol median is subtracted from the other samples, then squared to produce noise energy samples. The net error would be difficult to analyze because of the complication of additional filtering across reference subcarriers. However, this small error is assumed acceptable as sufficient verification of the filter gain for analysis in subsequent sections.

For these reasons and according to embodiments of the invention described herein, the computed branch metric prediction for nonlinear filtering should include an overall adjustment of about 2.3 dB (1.2+0.8+0.3 dB).

$$|VBM|=Cd/No-52.7+2.3=Cd/No-50.4 \text{ dB}$$

Branch Metric Warping

The ideal branch metrics increase in proportion to Cd/No. However, at low SNR, the channel symbols become overestimated. For example, the channel symbols estimated by the 5-tap median filter will generally have a non-zero median even when no signal is present. That is because the channel symbol is the median of the 5 noise samples. This will cause an underestimation of the noise variance. So, branch metrics are overestimated (warped) at low SNR. The expression for the CSIweight can be modified to "unwarp" the values at low SNR. This can be accomplished by multiplying the existing CSIweight with a warp factor CSIwarp.

$$CSIweightw = CSIweight \cdot CSIwarp$$

where $$CSIweight = \frac{a^*}{\sigma^2} \text{ and } CSIwarp = \frac{1}{\left[1+c \cdot \left(\frac{\sigma^2}{|a|^2}\right)^p\right]}$$

The value of parameters c and p can be empirically adjusted for best performance. The value of Cd/No is related to the nominal branch metric magnitude, including the gain correction factor for the nonlinear filtering.

$$|VBM| = 10 \cdot \log\left[\frac{1}{\sqrt{2}} \cdot \frac{|a|^2}{\sigma^2}\right] = Cd/No - 50.4 \text{ dB}$$

$$Cd/No = 10 \cdot \log\left[\frac{1}{\sqrt{2}} \cdot \frac{|a|^2}{\sigma^2}\right] + 50.4$$

Figure 8:
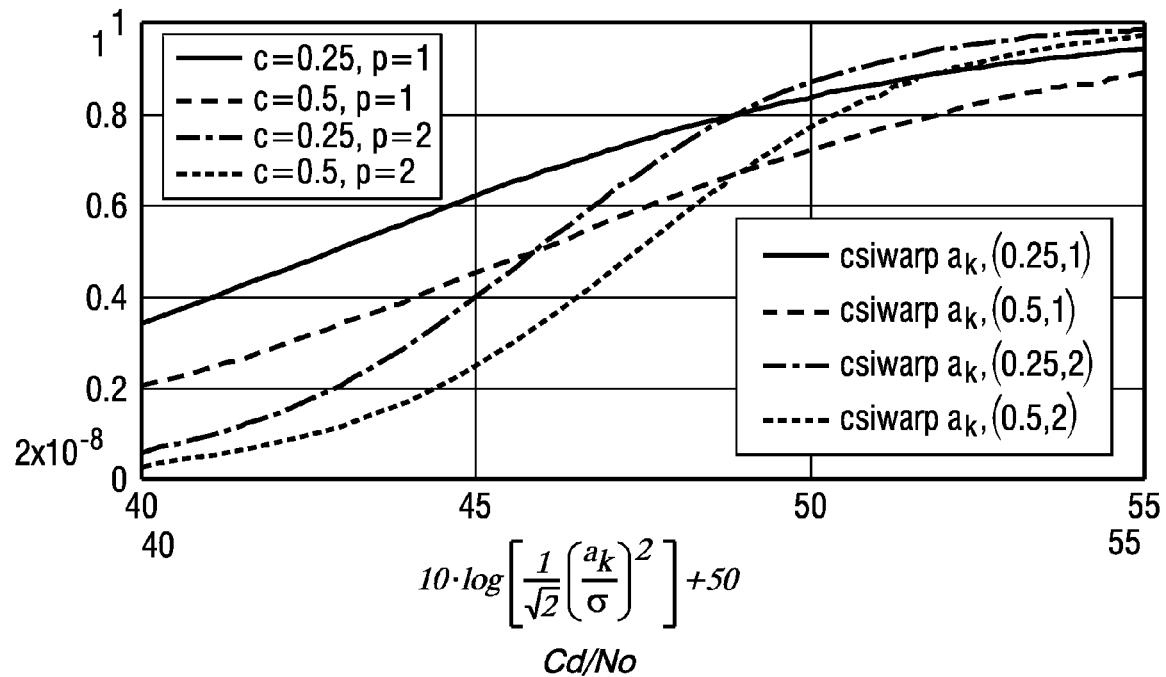
FIG. 8 is a graph illustrating the effects of warping of Viterbi Branch Metrics.

The plots of FIG. 8 show the effects of CSIwarp over a range of Cd/No, that is, the suppression of branch metrics at low SNR. Simulation results suggest using c=0.25, p=2, since it tends to offer the best performance over various conditions. As used in this description, "low SNR" means near zero dB (Ec/No) or lower.

Branch Metric Quantization

Memory constraints are satisfied by imposing quantization on the branch metrics. Quantization is determined by the number of bits used to represent the VBMs. Although 8 bits of quantization have been used, it is desirable to reduce this to fewer (e.g., 4) bits. The optimal quantization zone width (quantization resolution) is defined by the following formula:

$$T = \sqrt{\frac{No}{2^b}}$$

where No is a noise power spectral density, b is the number of bits for a soft decision, and T is in units of $\sqrt{Ec}$. So at Ec/No=1, the quantized value of the branch metric should be $\sqrt{2^b}$. The computed VBM in an IBOC receiver already has a factor of $\sqrt{2}$ in the computation, as well as a factor of about 1.3 due to the nonlinear filtering gain.

$$|VBM| = \left| \sqrt{Ec} \cdot \frac{\hat{a}^*}{\sigma^2} \right| = 1.3 \cdot \sqrt{2} \cdot \frac{Ec}{No}$$

Then the practical scale factor for the IBOC receiver branch metrics should be:

$$scale = 0.544 \cdot \sqrt{2^b}$$

Branchmetric_nzq=max{$-2^{b-1}+1$,min{$2^{b-1}-1$,round[scale·Branchmetric_nz]}}.

In one example, for b=4 bits of quantization, the scale factor could be scale=2.17. So ±4 would represent the quantized values at Ec/No=1, about Cd/No=54.2 dB_Hz. The maximum range is +7/−8, about 3 dB greater than ±Ec/No.

Figure 9:
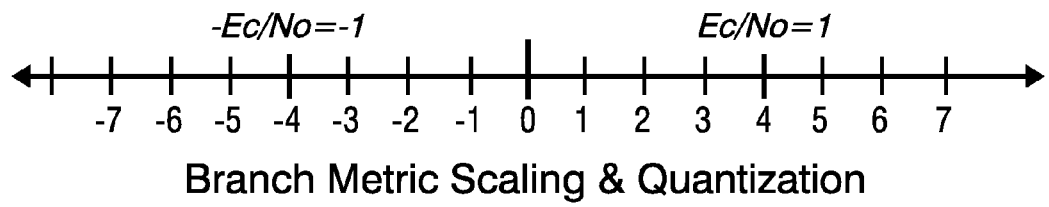
FIG. 9 is a representation of branch metric scaling and quantization.

FIG. 9 is a diagram showing scaling (scale=2.17) and quantization for Viterbi Branch Metrics. In FIG. 9, the numbers are the actual integer quanta values represented with 4 bits (16 possible numbers in 2's complement). For this example, an integer value of 4 (or ±4) is equivalent to Ec/No=1, or zero dB, where Ec/No is the code bit energy divided by the noise density.

The combined effects of scaling, quantization and warping were simulated to empirically determine the parameter settings for warping (p and c) as well as the scale factor associated with VBM quantization bits. These simulation results suggest a different scale factor than the previous analysis. Table 1 shows the recommended scale values for various quantization choices (bits for VBM).

The benefits of warping are best measured with one sideband, since the warping mitigates contamination from the missing sideband due to nonzero (noisy) VBMs. VBM quantization with best scaling was simulated (except an additional VBM scale factor of 32 was also used for 8-bit quantization to ensure saturation in the case of high impulsive noise samples). The recommended warping parameters are c=0.25, p=2. Over all conditions simulated, for 4-bit quantization, the loss is less than half a dB. For 3-bit quantization, it is less than one dB (with warping). For 2-bit quantization, degradation is less than 2 dB (again, with warping). The best choices for scale factor for each VBM quantization (bits) are bolded in Table 1.

TABLE 1

VBM Quantization Loss with Measured Best Scaling, BER Results of Matlab FM Simulation
Warping, c = 0.25, p = 2, Seed = 100, 5/24-25/12

| VBM Quantization (bits) | VBM Scaling | Warping | BER Degrad. (dB) vs. Floating-Point VBMs, AWGN @ 56 dB-Hz with One Sideband Disabled | BER Degrad. (dB) vs. Floating-Point VBMs, AWGN @ 54 dB-Hz | BER Degrad. (dB) vs. Floating-Point VBMs, UF Rayleigh Fading @ 57 dB-Hz |
|---|---|---|---|---|---|
| Float | NA | OFF | — | — | — |
| Float | NA | ON | −0.3 | 0.05 | 0.05 |
| 8 | 32 | OFF | 0.05 | 0.01 | 0 |
| 8 | 32 | ON | −0.05 | 0.08 | 0.12 |
| 8 | 8.704 | OFF | −0.15 | 0.06 | 0.04 |
| 8 | 8.704 | ON | −0.3 | 0.07 | 0.12 |
| 4 | 3.5 | OFF | 0.48 | 0.07 | 0.33 |
| 4 | 3.5 | ON | 0.17 | 0.11 | 0.34 |
| 3 | 2.5 | OFF | 1.11 | 0.3 | 0.71 |
| 3 | 2.5 | ON | 0.76 | 0.31 | 0.79 |
| 2 | 2 | OFF | 2.24 | 0.82 | 1.75 |
| 2 | 2 | ON | 1.22 | 0.85 | 1.68 |

Synchronization of VBMs

In the disclosed embodiments, both of the first and second receiver signal paths may operate independently (asynchronously). The VBMs from each receiver path are combined when available. Both receiver paths use their own acquisition and tracking, and the branch metrics must be aligned for combining. When only one receiver path has valid branch metrics, then the branch metrics from the other receiver path are not added.

Performance is near optimum when both receiver paths are tracking the signal with proper synchronization. The main performance enhancement is achieved in dynamic fading conditions. When one antenna is in a deep fade, the other antenna may not be faded, and vice versa. Tracking can flywheel over short fades or outages.

When one of the receiver paths is not tracking the signal, its branch metrics are effectively zero and MRC offers no additional advantage to the tracking demodulator, except to improve the probability that at least one demodulator is decoding the signal. This situation could be improved if tracking information were shared between receivers. The loss may be apparent in AWGN where tracking can be lost due to operation below the single-receiver SNR threshold, where the combining gain would offer sufficient bit error rate (BER) performance if this receiver was tracking.

Alternatively, both receiver paths could share synchronization based on both antenna signals. This option offers better performance, but extensive demodulator software modifications are required over the single demodulator. Alignment between branch metrics is trivial because both receiver paths are already synchronized. The acquisition and tracking is common to both signal paths. Synchronization between the pair of input signal paths should be ensured, and tuner local oscillator frequencies should be locked. Performance is improved under all conditions. The acquisition and tracking performance is improved along with the signal decoding BER performance.

II. Acquisition and Frame Synchronization Using DSQM

As previously stated, an FM IBOC receiver that implements MRC operates at low SNR conditions. Existing IBOC receivers use parameters for acquisition and frame synchronization that can, according to embodiments of the invention described herein, be optimized for these low SNR conditions using a Digital Signal Quality Metric (DSQM).

The Digital Signal Quality Metric (DSQM) is an algorithmic function used to measure (compute) the quality of a digital OFDM signal. The DSQM is a number ranging from zero to one, indicating the viability of the digital sidebands of an FM IBOC signal. A value near zero indicates that no useful signal is detected, while a value near one indicates that the signal quality is nearly ideal. A midrange value of 0.5, for example, indicates a corrupted but possibly decodable digital signal. U.S. Pat. No. 7,933,368 describes the DSQM function, and is hereby incorporated by reference.

The DSQM has several applications: 1) detect a viable digital signal channel for digital seek/scan, 2) establish initial symbol synchronization and carrier frequency offset for digital signal acquisition, 3) assess antenna element signal quality for diversity switching and MRC, where a more-efficient version, DSQM-lite, exploits knowledge of existing symbol synchronization.

Figure 10:
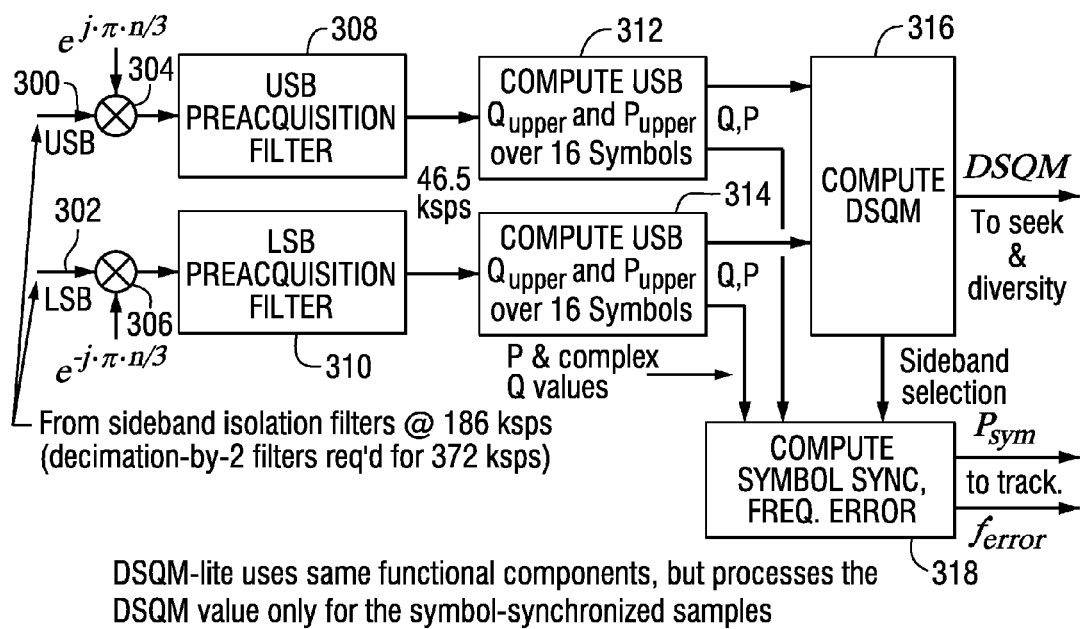
FIG. 10 is a functional block diagram illustrating a process for producing a digital signal quality metric.

FIG. 10 is a functional block diagram of DSQM processing. Upper sideband and lower sideband signals are received on lines 300 and 302 respectively. These signals can be received from sideband isolation filters at 186 ksps (where decimation by 2 filters are used for 372 ksps). The signals are shifted to base band in mixers 304 and 306. Preacquistion filters 308 and 310 filter the baseband signals. Signal quality metrics Q and peak index P for each digital sideband are determined as shown in blocks 312 and 314. Then the combined quality metrics Q and peak index P are used to compute a DSQM as shown in block 316. An estimate of symbol timing and (sub)carrier frequency offset for the initial acquisition case is computed as shown in block 318.

The DSQM computation shown in FIG. 10 is comprised of 5 related components: 1) shift center frequency of the preacquisition signal bandwidth to baseband, 2) preacquisition filter each sideband, 3) compute signal quality metrics Q and peak index P for each digital sideband, 4) combine the signal quality metrics to form composite DSQM, and 5) estimate symbol timing and (sub)carrier frequency offset for the initial acquisition case.

A portion of the USB and LSB signal bandwidths is used for the DSQM estimation. In one example, the desirable frequency portion is centered at about 155 kHz for the USB, and ~155 kHz for the LSB. A bandwidth of about 46.5 kHz is useful for DSQM because it allows for suppression of a potential first-adjacent analog signal. Nyquist sampling of these signals results in efficient computation.

The DSQM also estimates receiver symbol boundary and frequency error caused by different transmitter and receiver reference oscillators and symbol boundary uncertainty. Its one-time corrections are applied prior to the start of demodulation; synchronization is maintained thereafter by tracking control in the demodulator.

A more detailed description of DSQM is provided below, in Section III. DSQM Algorithm Description. A more efficient implementation of DSQM, called DSQM-lite, can be used for antenna diversity switching. U.S. patent application Ser. No. 13/165,325, filed Jun. 21, 2011 and titled "Method And Apparatus For Implementing Signal Quality Metrics And Antenna Diversity Switching Control", describes the DSQM-lite function, and is hereby incorporated by reference. The efficiency of DSQM-lite is derived from knowledge of the symbol synchronization after the signal has been acquired. Instead of processing the entire symbol vector, the DSQM is computed only for the synchronized samples within the symbol.

DSQM and/or DSQM-lite can be used to optimize parameters for the use of MRC antenna diversity in a receiver operating at a lower SNR. Since performance in AWGN can improve as much as 3 dB, the acquisition and tracking should also be capable of operating 3 dB lower. Even greater improvements in reception sensitivity are possible in fading. However, the fourth-power symbol tracking in the previously used demodulator implementations breaks down at these lower SNR operating conditions. Thresholds on DSQM and correlation requirements with sync patterns in the reference subcarriers for frame sync could be modified to improve acquisition at lower SNR. A functional block diagram of a receiver employing the MRC antenna diversity technique for OFDM signals is shown in FIG. 1.

A signal processing strategy described below includes eliminating the fourth-power symbol tracking, along with the fourth-power "Badtrack" detection. Badtrack is a condition where the symbol tracking settles somewhere other than the actual symbol boundary, and remains stuck there. The fourth-power technique is commonly used to strip the data phase modulation imposed upon QPSK symbols. This leaves the complex gain information used to estimate Channel State Information (CSI) that is used in subsequent Viterbi Branch Metric computations. The fourth-power operation multiplies the angle of the complex gain by 4. This is remedied by dividing the resulting angle by 4 to yield the channel phase. However, it also multiplies the noise by a factor of 4. This is typically acceptable for operation of a single receiver, since the acquisition and tracking algorithm based on the fourth-power operate acceptably at the lowest SNR for useful data. However, the lower operating SNR of an MRC receiver is prevented because of the increased noise due to fourth-power processing, so an alternate technique is sought.

Since the fourth-power processing is discarded, the symbol tracking is left to flywheel using the symbol timing sample offset determined by DSQM during this period. The sample timing error will drift during this time due to clock error (e.g., 100 ppm results in 18.6 samples/sec drift at 186 kHz sample rate). If the symbol timing drifts too far, then the symbol tracking loop may not be able to converge to the correct operating point. The symbol tracking using reference subcarriers is started after an initial subframe is found, which will prevent further symbol timing drift. Therefore, to avoid a false track condition, a reacquisition should be invoked within about 0.5 seconds after DSQM if the initial subframe is not found.

It is important to suppress faulty branch metrics from a demodulator so that it does not contaminate the alternate demodulator. This can happen during a faulty symbol tracking condition at low SNR. It is not necessarily a problem with a single (non MRC) demodulator because the signal may be undecodable anyway. Since MRC combines branch metrics from both demodulators, the possibility of contamination should be avoided. A DSQM-based Badtrack detector is described below for this purpose, as well as for reacquisition.

In addition, filtering should be used as described in the following sections.

Preacquisition Filtering

To prevent falsely acquiring on large second-adjacent channels, each primary sideband can be filtered prior to DSQM processing. The pre-acquisition filter can be designed to provide 60-dB stopband rejection while limiting the impact on the desired primary sideband.

An efficient means of computing the DSQM involves decimating the input complex baseband signal sample rate to approximately 46.5 ksps for each digital sideband (LSB & USB). This can be accomplished by using the set of isolation filters. However, if the output sample rate of the digital sidebands is 372 ksps, then a pair of decimation-by-2 filters can be inserted in front of the complex mixers and preacquisition filters to provide the expected sample rate of 186 ksps.

Halfband Highpass Filter

Figure 11:
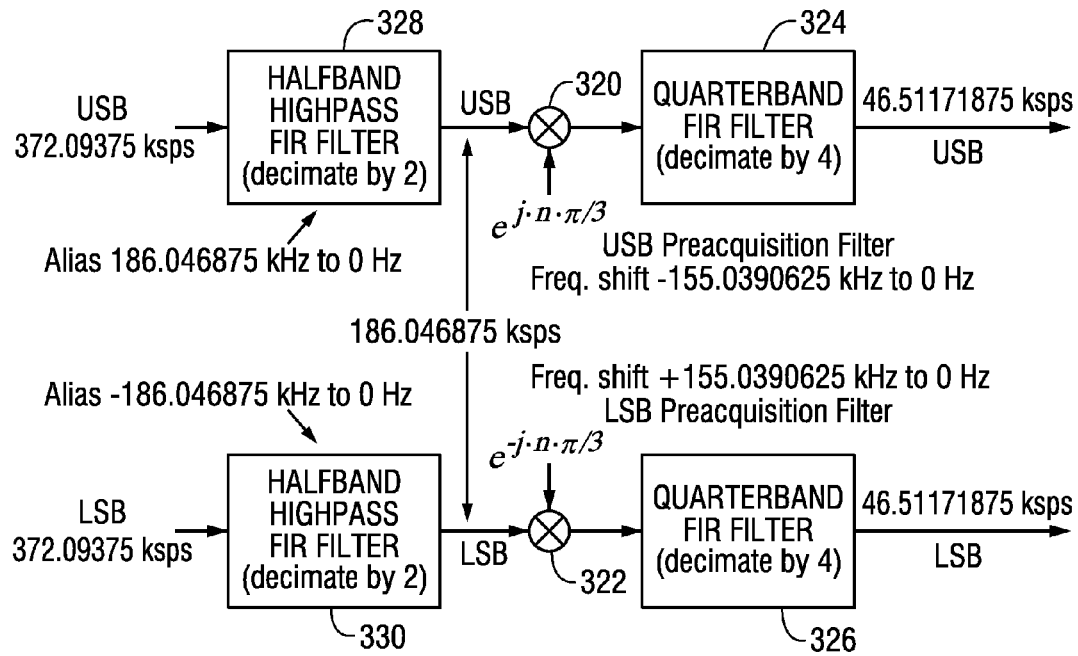
FIG. 11 is a functional block diagram of a filter circuit.

FIG. 11 is a functional block diagram of preacquisition filters preceded with decimation filters. FIG. 11 shows the complex mixers 320, 322 and preacquisition filters 324, 326 proceeded by a Halfband Highpass filter 328, 330 to reduce the input sample rate from 372 to 186 ksps. Complex USB and LSB baseband digital samples are output from the USB and LSB isolation filters at 372 ksps. A Halfband Highpass filter is used to decimate the USB or LSB sample rates from 372 ksps to 186 ksps. The spectrum of this filter has halfband symmetry, with alternating coefficients equal to zero. Integer versions of these filter coefficients are presented in Table 2, showing only one-sided coefficients starting at center coefficient index 0 through 15. These integer coefficients would be multiplied by $2^{-15}$ for a unity passband gain. The negative-indexed coefficients (not shown in Table 2) are equal to the positive-indexed coefficients.

After decimation-by-2 to 186 ksps, and complex mixing, the USB and LSB digital sidebands undergo further filtering by the pre-acquisition filter. This filter should have linear phase and a minimum output sample rate consistent with passband characteristics. The upper and lower sidebands should each have a passband of about 46 kHz, in order to minimize corruption from first-adjacent analog and second-adjacent digital interference. This filter can be designed using a decimate-by-4 output sample rate (46.51171875 ksps).

TABLE 2

Positive-Indexed Coefficients of Halfband Highpass USB or LSB Filter.
Coefficients 0 through 15 of Halfband Filter, Starting with Center Coefficient

| 0 | 16384  | 4 | 0     | 8  | 0    | 2 | 0   |
|---|--------|---|-------|----|------|---|-----|
| 1 | −10292 | 5 | −1479 | 9  | −343 | 3 | −34 |
| 2 | 0      | 6 | 0     | 10 | 0    | 4 | 0   |
| 3 | 3080   | 7 | 741   | 11 | 131  | 5 | 4   |

Figure 12:
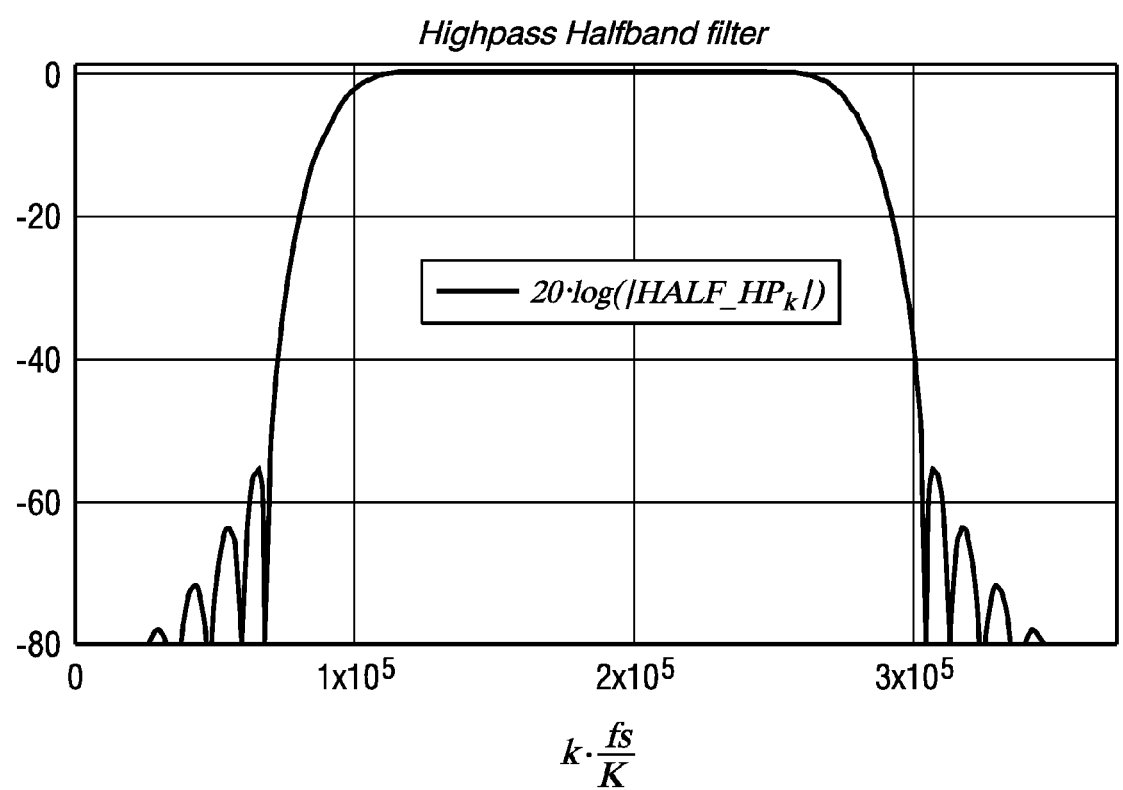
FIG. 12 shows the spectrum of a Highpass Halfband Filter.

FIG. 12 shows the spectrum of Highpass Halfband Filter before decimation-by-2. The output after decimation-by-2 will center the filter passband to zero Hz. The plots show the undecimated responses over the Nyquist bandwidth for complex input sample rate 372 ksps, although only the decimated output is computed (for efficiency). Notice that the baseband 6-dB passband spans the halfband bandwidth from 93 kHz to 279 kHz, the Nyquist bandwidth at the output sample rate. The LSB decimation filter has an identical spectrum, but with negative frequencies. In FIG. 12, the units for the vertical axis are dB and for the horizontal axis Hz (frequency); k is a sample index, and K is the total number of samples in FFT.

Quarterband Pre-Acquisition Filter

The quarterband pre-acquisition filter efficiently isolates a portion of the output passband of the upper or lower primary digital sideband filter, suppressing the effects of adjacent-channel interference. In one embodiment, prior to filtering, the isolated USB is effectively frequency-shifted by −155.0390625 kHz, and the isolated LSB is effectively frequency-shifted by +155.0390625 kHz. The frequency shifting centers the pre-acquisition filter at baseband (dc), reducing complexity by allowing a symmetric (real) quarterband filter. In practice, the frequency shifting can be accomplished by mixing the baseband alias of the input USB by 31.0078125 kHz ($e^{j \cdot \pi \cdot n/3}$). In a similar manner, the baseband alias of the input LSB can be shifted by −31.0078125 kHz ($e^{-j \cdot \pi \cdot n/3}$). This frequency shifting allows the complex phasor to be stored in a circular lookup table with only 6 coefficients per cycle.

In one example, vectors for complex frequency shifting and filter coefficients are computed and pre-stored. Pre-store the complex exponential in a 6-element vector fshft.

$$fshft = \begin{pmatrix} 1 \\ \exp\{j \cdot \pi/3\} \\ \exp\{j \cdot 2 \cdot \pi/3\} \\ -1 \\ \exp\{-j \cdot 2 \cdot \pi/3\} \\ \exp\{-j \cdot \pi/3\} \end{pmatrix} = \begin{pmatrix} 1 \\ 0.5 + j \cdot 0.866 \\ -0.5 + j \cdot 0.866 \\ -1 \\ -0.5 - j \cdot 0.866 \\ 0.5 - j \cdot 0.866 \end{pmatrix}$$

The pre-acquisition filter output is further decimated by 4, and is subsequently used for acquisition. The filter spectrum has quarterband symmetry, in which every fourth coefficient is zero. Integer versions of these filter coefficients are presented in Table 3, showing only positive-indexed coefficients, starting at center index 0 through 11. These integer coefficients would be multiplied by $2^{-15}$ for unity passband gain. The negative-indexed coefficients are equal to the positive-indexed coefficients.

TABLE 3

Positive-Indexed Coefficients of Quarterband Pre-acquisition Filter
Coefficients 0 through 11 of Quarterband Pre-acquisition Filter,
Starting with Center Coefficient

| | |
|---|---|
| 0 | 8192 |
| 1 | 7242 |
| 2 | 4846 |
| 3 | 2080 |
| 4 | 0 |
| 5 | −912 |
| 6 | −852 |
| 7 | −386 |
| 8 | 0 |
| 9 | 130 |
| 10 | 100 |
| 11 | 40 |

Figure 13:
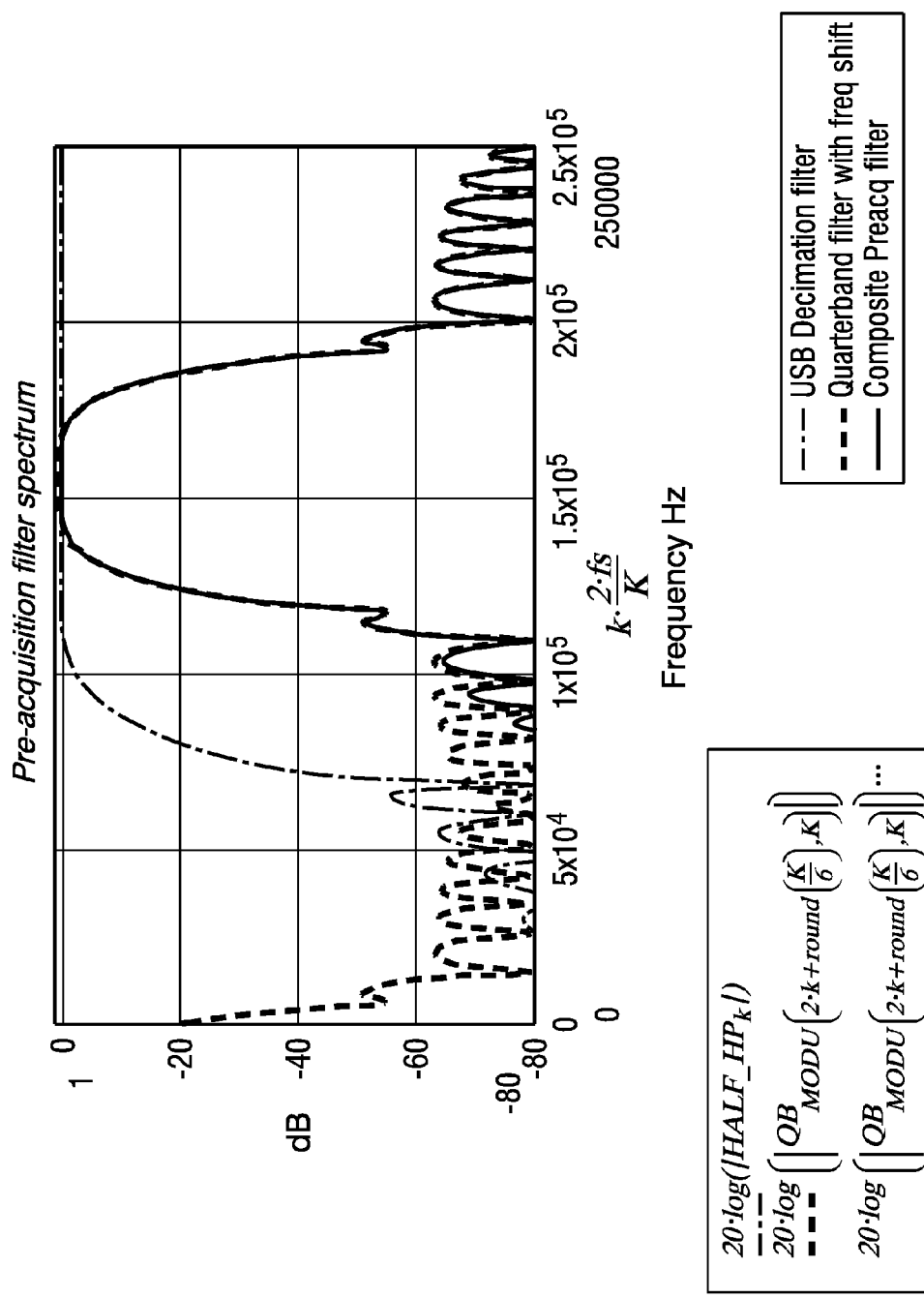
FIG. 13 shows the magnitude spectrum of the pre-acquisition filter.

The magnitude spectrum of one embodiment of the pre-acquisition filter for the USB is shown in FIG. 13. The plots show the responses over a selected bandwidth within the 372 ksps sample rate so the filter effects beyond 200 kHz can be seen on the plot. The actual output of the preacquisition filter is aliased to center the filter at zero Hz at a sample rate of 46.5 ksps. These plots include the output spectrum of the upper primary digital sideband decimation filter, and the effective spectrum of the quarterband pre-acquisition filter. Notice that the baseband passband spans the quarterband bandwidth from about 132 to 178 kHz. This passband was chosen to minimize corruption during acquisition due to first-adjacent analog FM interference and second-adjacent digital sideband interference. The LSB characteristics are the same, but with negative baseband frequencies.

III. DSQM Algorithm Description

The DSQM computation exploits cyclic prefix correlation within each symbol to construct correlation peaks. The position of the peaks indicates the location of the true symbol boundary within the input samples, while the phase of the peaks is used to derive the frequency offset error over a subcarrier spacing. Frequency diversity is achieved by independently processing the upper and lower primary sidebands. When both sidebands are viable, then they are combined to improve the estimate. An efficient means for computing the DSQM involves decimating the frequency-shifted input complex baseband signal sample rate to approximately 46.5 ksps. A functional block diagram of an embodiment of the quality metric computation for each sideband is shown in FIG. 14.

Figure 14:
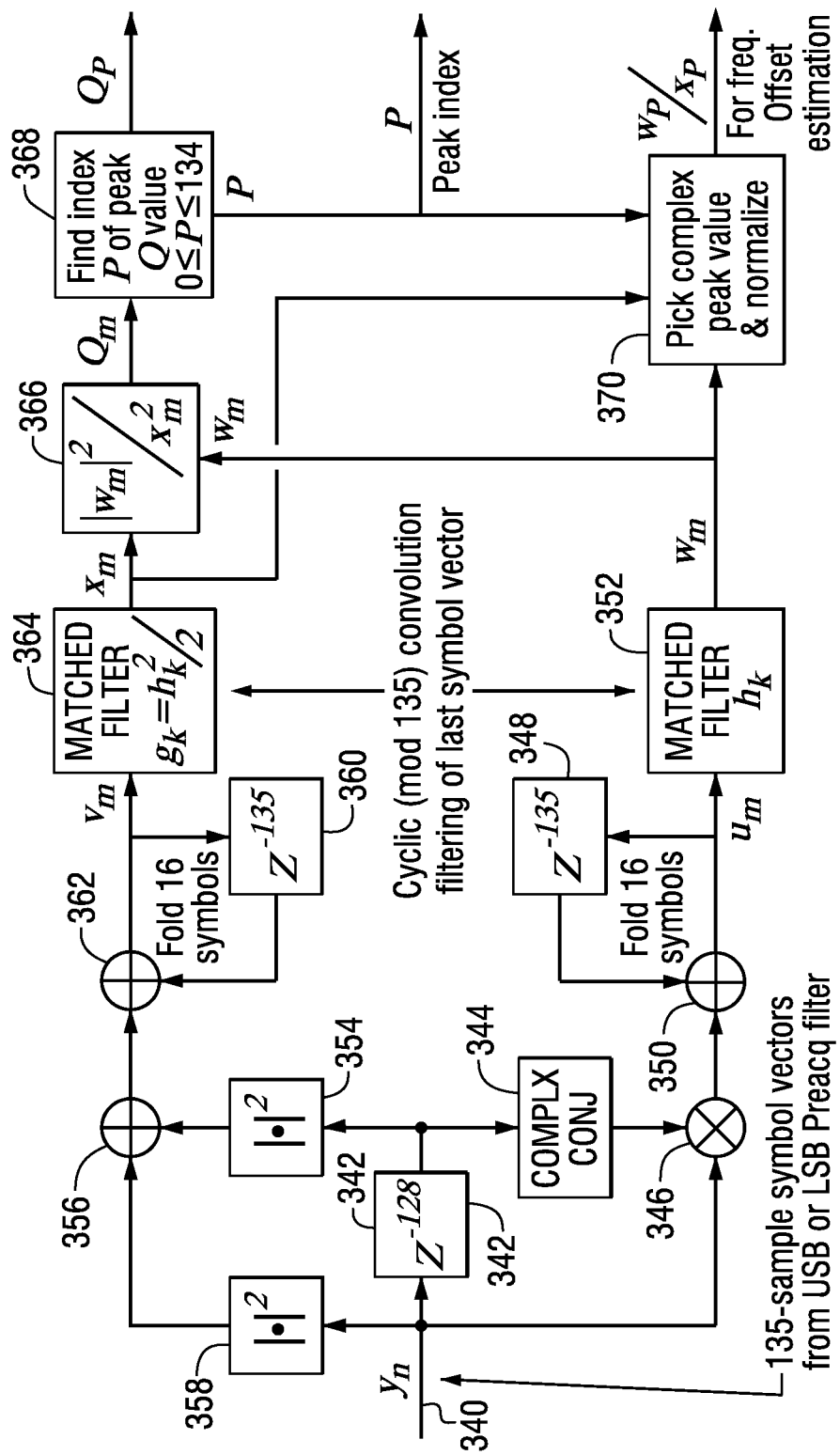
FIG. 14 is a functional block diagram of the quality metric computation.

FIG. 14 illustrates the USB or LSB quality metric computations. The inputs to DSQM Processing are symbol-size blocks of upper and lower primary sideband samples. Each block is comprised of 135 complex samples at a rate of approximately 46.5 ksps, representing one symbol time. These blocks have arbitrary boundaries that do not necessarily coincide with the boundaries of the transmitted symbols. However, by exploiting a correlation inherent within the transmitted symbols, their true boundaries can be ascertained.

The input 340 is a 135-sample symbol received from either the upper or lower sideband preacquisition filter. The input samples are shifted by 128 samples 342 and the complex conjugate 344 of the shifted samples is multiplied 346 by the input samples. Sixteen symbols are folded as shown by block 348 and adder 350. The folded sums are filtered by a matched filter 352.

The magnitude squared 354 of each input symbol is delayed 342 by 128 samples and added 356 to the current magnitude-squared samples 358. Sixteen symbols are folded as shown by block 360 and adder 362. The folded sums are matched filtered 364. The ratio of the square of the absolute value of the output of matched filter 352 and the square of the output of the matched filter 364 is computed as show in block 366 to produce signal $Q_m$. The index of the peak value of Q is found as shown in block 368. The complex peak value is picked and normalized as shown in block 370, and the result is used for frequency offset estimation.

In the example illustrated by FIG. 14, due to a cyclic prefix applied at the transmitter, the first and last 6 samples (at 46.5 ksps) of each transmitted symbol are highly correlated. It is assumed that a zero-value sample is synchronized to the symbol boundary, so processing of the seventh sample is avoided. DSQM processing reveals this correlation by complex-conjugate multiplying each sample in its arbitrary symbol framing with its predecessor 128 samples away. When the products lie within the cyclic prefix region of the same transmitted symbol, they form a 6-sample peak with a common phase and amplitude that reflects half of the complementary root-raised-cosine pulse shape on each end of the symbol. The location of this correlation peak within the 135-sample product indicates the transmitted symbol boundary, and the phase indicates the frequency error.

The 6-sample correlation peak over a single symbol is not easily distinguished from the noisy products of the uncorrelated samples. To enhance detectability of the peak, the corresponding correlation products of 16 contiguous symbols are "folded" on top of one another (pointwise added) to form a 135-sample acquisition vector. This "conjugate-fold" operation, after initializing vector u to zeroes, is described as $$u_{mod(n,135)} = u_{mod(n,135)} + y_n \cdot y^*_{n-128}; \text{ for } n=0, 1, \ldots, 135 \cdot S - 1,$$

or equivalently, $$u_m = \sum_{s=0}^{S-1} y_{m+135s} \cdot y^*_{m-128+135s}; \text{ for } m = 0, 1, \ldots, 134,$$

where y is the input signal from the preacquisition filter, u is the folded acquisition vector, m is the folded vector sample index, s is the folded symbol index, and S=16 is the acquisition block size (or total number of folded symbols).

The 6-sample folded peak, although visible within the acquisition vector, is still somewhat noisy. Therefore, the peak is enhanced with a 6-tap FIR filter $h_k$ whose impulse response is matched to the shape of the correlation peak.

$$w_m = \sum_{k=0}^{5} u_{mod(m+k,135)} \cdot h_k;$$

for $m = 0, 1, \ldots, 134$ where m is the output sample index, u is the matched-filter input, w is the matched filter output, and h the filter impulse response defined below.

$$h_k = \cos\left(\pi \cdot \frac{(2 \cdot k - 5)}{14}\right);$$

-continued $$\text{or } h = \begin{pmatrix} 0.434 \\ 0.782 \\ 0.975 \\ 0.975 \\ 0.782 \\ 0.434 \end{pmatrix} \text{ for } k = 0, 1, \ldots, 5$$

Notice that this filter is even symmetric with 6 taps, having an effective group delay of 2.5 samples. This group delay must be accommodated when locating the symbol-synchronized samples at the higher non-decimated sample rate.

The correlation peak is enhanced by normalization. Not only is there a phase correlation between the first and last 6 samples of an OFDM symbol, but there is also an amplitude correlation due to the root-raised cosine pulse shaping applied at the transmitter. This amplitude correlation can be exploited as follows. The magnitude squared of each input symbol is delayed by 128 samples and added to the current magnitude-squared samples, as shown in FIG. 14. After folding the first 16 symbols and matched filtering, a symbol boundary is apparent. The location of the symbol boundary is marked by a reduction in amplitude of the resultant waveform. Normalization of the existing correlation peak with this waveform enhances the peak by reducing the level of all samples except those coincident with the symbol boundary. This operation, after initializing vector v to zeroes, is described as $$v_{mod(n,135)} = v_{mod(n,135)} + |y_n|^2 + |y_{n-128}|^2; \text{ for } n = 0, 1, \ldots, 135 \cdot S - 1,$$

or equivalently, $$v_m = \sum_{s=0}^{S-1} (|y_{m+135s}|^2 + |y_{m-128+135s}|^2);$$

for $m = 0, 1, \ldots, 134$, where y is the input signal from the preacquisition filter, v is the folded vector, m is the folded vector sample index, s is the folded symbol index, and S=16 is the acquisition block size (or total number of folded symbols).

The 6-sample folded peak, although visible within the acquisition vector, is still somewhat noisy. Therefore, the vector v is enhanced with a 6-tap FIR filter $g_k$ whose impulse response is matched to the shape of the symbol boundary region.

$$x_m = \sum_{k=0}^{5} v_{mod(m+k,135)} \cdot g_k;$$

for $m = 0, 1, \ldots, 134$.

The matched filtering of the normalization waveform is identical to that performed for the correlation peak, except the matched filter taps are squared and then halved to ensure proper normalization:

$$g_k = h_k^2 \text{ for } k = 0, 1 \ldots, 5; \text{ or } g = \begin{pmatrix} 0.094 \\ 0.306 \\ 0.475 \\ 0.475 \\ 0.306 \\ 0.094 \end{pmatrix}$$

where k is the index of taps in the matched filters, $h_k$ are the existing taps for the conjugate-multiplied correlation peak, and $g_k$ are the new taps for the normalization waveform. Notice that this filter is also even symmetric with 6 taps, having an effective group delay of 2.5 samples. This group delay must be accommodated when locating the symbol-synchronized samples at the higher non-decimated sample rate. A quality metric vector Q is computed from vectors w and x.

$$Q_m = \frac{|w_m|^2}{x_m^2}; \text{ for } m = 0, \ldots, 134$$

The peak value $Q_P$ of the vector Q, and its index P, are identified. The peak value $Q_P$ is further processed to reduce the probability of false detection due to a spur, for example. A strong spur in the absence of noise or digital signal could produce a correlation peak that is greater than one over the entire symbol correlation vector. To prevent this false detection, conditions are placed on the $Q_P$ result, which would zero the $Q_P$ if a false detection is suspected. One condition is that the peak $Q_P$ value must be less than one. A second condition is that the sum of the correlation samples, spaced every 3 samples away from the peak sample, must be less than some value (for example, this sum must be less than 2). This discrimination is implemented by multiplication of the peak value $Q_P$ by two Boolean (0 or 1 value) expressions.

$$Q_P = Q_P \cdot (Q_P < 1) \cdot \left( \sum_{k=1}^{44} Q_{mod\{P+3 \cdot k, 135\}} < 2 \right)$$

The peak value of the normalized correlation waveform is representative of the relative quality of that sideband. The entire computation just described in this section is done for both the USB and the LSB, and the final results are saved as $Q_U$, $Q_L$, $P_U$ and $P_L$ for subsequent DSQM computation.

Once the correlation waveform is effectively normalized for each sideband, the value and index of the peak are found. The peak index delta compares the peak indices of the upper and lower sidebands for each sixteen-symbol block. Since the symbol boundaries are modulo-135 values, the computed deltas must be appropriately wrapped to ensure that the minimum difference is used.

$$\Delta P = \min\{|P_U - P_L|, 135 - |P_U - P_L|\}$$

where $P_U$ and $P_L$ are the peak indices of the normalized correlation waveform for the upper and lower sidebands.

DSQM Calculation

Once the peak index delta and quality estimates have been computed, they are used to calculate the DSQM. The DSQM separately examines the quality of each individual sideband, in addition to evaluating the peak index delta and sum of the quality estimates from both sidebands. In this way, a viable signal can be successfully identified even when one of its sidebands has been corrupted by interference.

False detections may occur on an analog-only signal in a very low-noise channel. In this case, some of the FM signal components exist in the DSQM detection band, and can trigger DSQM detection. The correlation on upper and lower sidebands is unlikely to peak at the same location, and this false detection would more likely occur on one sideband only.

A temporal consistency check can be used to discriminate against this condition. This temporal consistency check prevents initial detection on one sideband only. If only one sideband passes the threshold on the first DSQM measurement, and $\Delta P > 1$, then a second DSQM computation is used to assess if the correlation peak occurs at the same location ($P_L$, or $P_U$) on that sideband. If the peak index from a sideband is consistent on two consecutive DSQM measurements, then the acquisition is declared successful.

Figure 15:
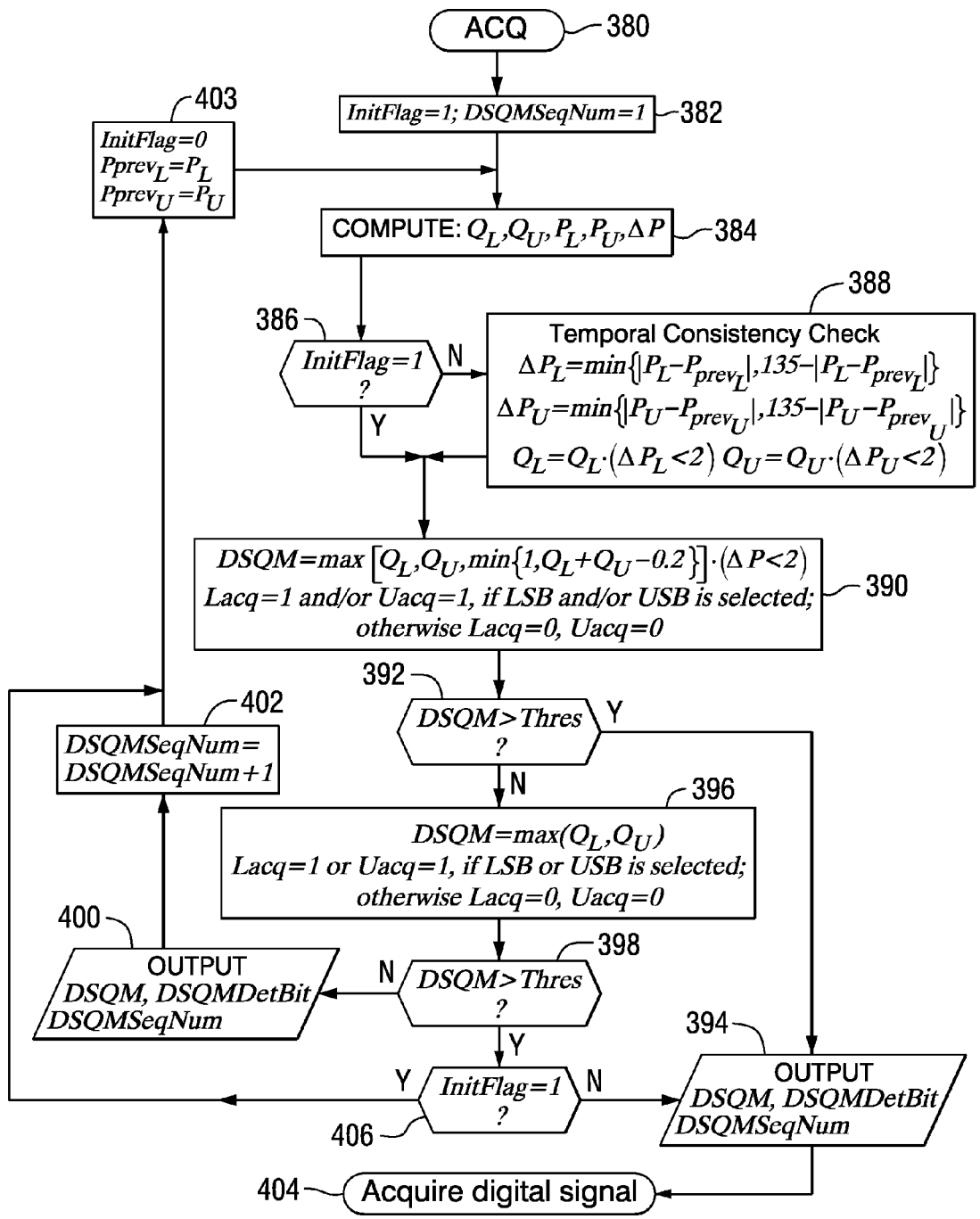
FIG. 15 is a flowchart for the acquisition of the digital signal.

The flowchart of FIG. 15 can be used for acquisition of the digital signal. It can also be used in a seek function, coordinated by the host controller, for example. The seek signal quality threshold SeekThres is usually set to a higher level than that used for acquisition, so that the seek function stops on only a reasonably good signal. The normal acquisition threshold Thres is lower to allow acquisition on marginal signals. Seek or acquisition is determined to be successful or not after one or two iterations. The algorithm continues to iterate until the digital signal is successfully acquired, or is interrupted by the host controller, for example.

The first iteration of the ACQ algorithm 380 is indicated by initializing the InitFlag to one, and DSQMSeqNum to one (block 382). Quality metrics $Q_L$ and $Q_U$, peak index indices $P_L$ and $P_U$, and $\Delta P$ are computed (block 384). If the initial flag is not equal to 1 (block 386), a Temporal Consistency Check is performed on each sideband (block 388), except on the first iteration when previous Peak indices are not available. If the initial flag is equal to 1, a DSQM is computed and selected (maximum Q, if $\Delta P < 2$); upper and/or lower sideband(s) are identified by setting $L_{acq}=1$ and/or $U_{acq}=1$ (block 390). If this DSQM value exceeds the acquisition threshold Thres (e.g., Thres=0.2) (block 392), then the DSQM value, along with DSQMSeqNum and DSQMDetBit, are output (block 394). The DSQMDetBit is determined by Boolean result of comparing the DSQM to the Seek Threshold (e.g., 0.5).

DSQMDetBit=DSQM>SeekThres

If the first DSQM (of this iteration) fails to exceed the acquisition threshold (e.g., 0.2), then another DSQM is computed based on the maximum of $Q_L$ or $Q_U$ (but not both together) (block 396). If this DSQM fails to exceed the acquisition threshold (block 398), then this DSQM value, DSQMSeqNum and DSQMDetBit are output (block 400) and DSQMSeqNum is incremented (block 402); the next iteration of the algorithm is then executed using the parameters in block 403. However, if this DSQM exceeds the acquisition threshold, then successful acquisition is declared (block 404) (if this is not the first algorithm iteration, block 406); otherwise, the next algorithm iteration can resume.

IV. Frequency & Timing Acquisition Example

Acquisition is the process of establishing initial symbol synchronization and frequency offset for subsequent tracking. A threshold for DSQM is established where a sufficiently reliable signal is detected. The symbol timing sample is determined by the peak quality index P. This index is determined with a decision rule based on which sidebands were used to yield the final DSQM value. The selected sidebands are indicated by the Boolean values of Lacq and Uacq, as determined in the algorithm of FIG. 15. If either the USB or LSB alone were used, then the peak index would be the index of the selected sideband. However, if both sidebands were used, then the indices are averaged modulo 135. Adjustments to this value for decimation, filter delays, or other implementation delays must be performed.

$$P = \begin{cases} P_L & ; \text{if } (Lacq = 1) \wedge (Uacq = 0) \\ P_U & ; \text{if } (Lacq = 0) \wedge (Uacq = 1) \\ \frac{P_L + P_U}{2} & ; \text{if } (Lacq = 1) \wedge (Uacq = 1) \wedge (|P_L - P_U| < 2) \\ 134.5 & ; \text{if } (Lacq = 1) \wedge (Uacq = 1) \wedge (|P_L - P_U| > 133) \end{cases}$$

The frequency offset in Hz can be estimated using the complex value of the normalized correlation peak. The value for each sideband can be phase-adjusted to accommodate the frequency-shifting from the center of the preacquisition bandwidth. The final value depends on which sideband(s) is used, per the following expression:

$$Qcmplx_U = \frac{\text{w\_upper}_{P_U}}{\text{x\_upper}_{P_U}} \cdot e^{j \cdot 2\pi/3}$$

$$Qcmplx_L = \frac{\text{w\_lower}_{P_L}}{\text{x\_lower}_{P_L}} \cdot e^{-j \cdot 2\pi/3}$$

$$Qcmplx = \begin{cases} Qcmplx_U & ; \text{if } (Uacq = 1) \wedge (Lacq = 0) \\ Qcmplx_L & ; \text{if } (Uacq = 0) \wedge (Lacq = 1) \\ Qcmplx_U + Qcmplx_L & ; \text{if } (Uacq = 1) \wedge (Lacq = 1) \end{cases}$$

The frequency error in Hz is proportional to the angle of Qcmplx.

$$f_{error} = \frac{f_{subcarrier\_space}}{2 \cdot \pi} \cdot \arctan\left\{\frac{\text{Im}(Qcmplx)}{\text{Re}(Qcmplx)}\right\}$$

However the NCO may require the negative of this frequency error to be translated into a phase increment phinc in radians per sample.

$$phinc = -\frac{2 \cdot \pi \cdot f_{error}}{f_s};$$

where $f_s$ is the NCO sample rate.

Furthermore, it is common for fixed-point implementations to use the modulus range of a two's complement number to represent a full circle.

V. DSQM-Lite for Antenna Diversity

While a digital signal quality metric (DSQM) can be used for antenna diversity switching, the DSQM computed during signal acquisition is computationally intensive, and involves redundant processing after symbol synchronization is established. This section describes an algorithm for more efficient DSQM computation, called DSQM-Lite. It is derived from the acquisition algorithm described in previous sections, but the computational complexity is reduced by taking advantage of symbol synchronization. Since the locations of the cyclic prefix regions of the symbols are known, there is no need to compute all the correlation points across the entire symbol.

This DSQM function is based on the previously described DSQM technique to generate an appropriate metric that can be used for antenna diversity switching (among other uses). The DSQM algorithms process groups of 16 symbols to produce a metric.

Since the symbol boundaries are already established in the symbol dispenser when the DSQM is used for diversity switching, there is no need to compute more than one peak, and the phase information is not needed or used here.

Efficient Computation of DSQM for Diversity Switching

After initial acquisition as described in Section IV above, a substantial reduction in MIPS (millions of instructions per second) can be realized by limiting the processing of signal samples to the cyclic prefix regions of the symbols. Since the symbol samples are already framed by the symbol dispenser in the present implementation, it is relatively straightforward to select the cyclic prefix regions for DSQM processing. There are only 6 samples to process at each end of the 135-sample symbol at the decimate-by-16 sample rate. It will be shown later that only sample indices 1 through 6 and 129 through 134 need to be computed; sample 0 is not needed since it should be synchronized to have a zero value.

DSQM-Lite Computation

A process for computing DSQM-Lite uses the following steps.

STEP 0 (for 372 ksps input): If the input sample rate is not approximately 186 ksps, then a decimation filter can be inserted to achieve that sample rate. A Halfband Highpass decimation filter was previously described for this purpose; however, it is more efficient to compute only the samples needed for this DSQM-lite computation. Define USB2x and LSB2x as the 1080-sample input symbol vectors at 372 ksps. These vectors are filtered by the 31-element Halfband Highpass filter hbf, while decimating by 2 to yield 540-element vectors USB and LSB. Notice that although 540-sample vectors are generated, only the range n=1 to 35 and n=505 to 539 need be computed, and the remaining uncomputed elements are set to zero.

$$USB_n = \sum_{k=0}^{30} USB2x_{2 \cdot n+k} \cdot hbf_k;$$

for $$n = 1 \ldots 35$$

and $$n = 505 \ldots 539$$

$$LSB_n = \sum_{k=0}^{30} LSB2x_{2 \cdot n+k} \cdot hbf_k;$$

for $$n = 1 \ldots 35$$

and $$n = 505 \ldots 539$$

Uncomputed elements n=0 and n=36 through 504 are not used in subsequent calculations. Filter coefficients for hbf are scaled by $2^{-15}$ for fixed point implementation.

$$hbf = \begin{pmatrix} 4 \\ 0 \\ -34 \\ 0 \\ 131 \\ 0 \\ -343 \\ 0 \\ 741 \\ 0 \\ -1479 \\ 0 \\ 3080 \\ 0 \\ -10292 \\ 16384 \\ -10292 \\ 0 \\ 3080 \\ 0 \\ -1479 \\ 0 \\ 741 \\ 0 \\ -343 \\ 0 \\ 131 \\ 0 \\ -34 \\ 0 \\ 4 \end{pmatrix}$$

STEP 1: Place the frequency-shifted endpoints pshft and qshft for the upper and lower sidebands in vectors for each symbol:

$$\text{pshft\_upper}_n = \begin{cases} USB_{n-7} \cdot fshft_{mod(n+5,6)}; & \text{for } n > 7 \\ 0; & \text{otherwise} \end{cases}$$

$$\text{qshft\_upper}_n = \begin{cases} USB_{n+505} \cdot fshft_{mod(n+1,6)}; & \text{for } n < 35 \\ 0; & \text{otherwise} \end{cases}$$

$$\text{pshft\_lower}_n = \begin{cases} LSB_{n-7} \cdot fshft^*_{mod(n+5,6)}; & \text{for } n > 7 \\ 0; & \text{otherwise} \end{cases}$$

$$\text{qshft\_lower}_n = \begin{cases} LSB_{n+505} \cdot fshft^*_{mod(n+1,6)}; & \text{for } n < 35 \\ 0; & \text{otherwise} \end{cases}$$

for n = 0,1 ...,42 *sample* index for each successive symbol

STEP 2: These vectors are filtered with hqb, and then decimated by a factor of 4.

$$p\_upper_m = \sum_{k=0}^{22} pshft\_upper_{k+4 \cdot m} \cdot hqb_k$$

$$q\_upper_m = \sum_{k=0}^{22} qshft\_upper_{k+4 \cdot m} \cdot hqb_k$$

$$p\_lower_m = \sum_{k=0}^{22} pshft\_lower_{k+4 \cdot m} \cdot hqb_k$$

$$q\_lower_m = \sum_{k=0}^{22} qshft\_lower_{k+4 \cdot m} \cdot hqb_k$$

for $m = 0, 1, \ldots, 5$

STEP 3: The "conjugate multiply and fold" operation is mathematically described for each upper or lower sideband by the following equations:

$$u\_upper_m = \sum_{s=0}^{S-1} p\_upper_{m,s} \cdot q\_upper_{m,s}^*$$

$$u\_lower_m = \sum_{s=0}^{S-1} p\_lower_{m,s} \cdot q\_lower_{m,s}^*$$

for $m = 0, 1, \ldots, 5$ where s is the folded symbol index, and S=16 symbols is the acquisition block size.

STEP 4: The normalization factor v is used to scale the DSQM to a 0 to 1 range:

$$v\_upper_m = \sum_{s=0}^{S-1} (|p\_upper_{m,s}|^2 + |q\_upper_{m,s}|^2)$$

$$v\_lower_m = \sum_{s=0}^{S-1} (|p\_lower_{m,s}|^2 + |q\_lower_{m,s}|^2)$$

for $m = 0, 1, \ldots, 5$

STEP 5: The quality Q value for either the lower or upper sideband is computed as:

$$Q_U = \frac{\left|\sum_{m=0}^{5} u\_upper_m \cdot h_m\right|^2}{\left(\sum_{m=0}^{5} v\_upper_m \cdot g_m\right)^2}$$

$$Q_L = \frac{\left|\sum_{m=0}^{5} u\_lower_m \cdot h_m\right|^2}{\left(\sum_{m=0}^{5} v\_lower_m \cdot g_m\right)^2}$$

where filter coefficients h and the g are precomputed as:

$$h = \begin{pmatrix} 0.434 \\ 0.782 \\ 0.975 \\ 0.975 \\ 0.782 \\ 0.434 \end{pmatrix};$$

and $$g = \begin{pmatrix} 0.094 \\ 0.306 \\ 0.475 \\ 0.475 \\ 0.306 \\ 0.094 \end{pmatrix}.$$

STEP 6: Finally, the composite DSQM metric is computed (0<DSQM<1). Notice that the additional sample timing condition is not imposed when the two sidebands are combined. This is because symbol synchronization is assumed and the timing alignment is ensured by the symbol dispenser.

$$DSQM = \max[Q_U, Q_L, \min\{1, Q_U + Q_L - 0.2\}]$$

Next, the effect of DSQM quality threshold (Q) and peak sample delta (ΔP) threshold is examined. Simulation results were used to estimate the probability of an individual (e.g., one sideband) DSQM symbol timing error (135 samples/symbol) as a function of Cd/No. For the purpose of this analysis it is assumed that the timing error is relative to zero, and is defined over 135 samples ranging from −67 to +67. Negative timing errors have the same probability as positive timing errors, so they are not shown in the tables below. The timing error is assumed uniform outside of ±5 samples, the cyclic prefix region.

Tables 4 through 7 show the conditional probability Psample(P,thres,Cd/No) that P is a particular one of the 135 possible values, given that the quality threshold (i.e., 0.0, 0.1, 0.15, and 0.2) is exceeded (Q>thres) as characterized through simulation. The variable Cd/No is the carrier to noise density ratio in units of dB_Hz. Although a greater thres value discriminates against erroneous peaks, it also reduces successful acquisition probability for each DSQM trial. Notice that Table 4 imposes no quality condition on DSQM quality threshold since thres=0.0 in this case.

TABLE 4

Probability of timing error when DSQM >0.0, Psample (P, 0.0, Cd/No)

| Timing Error P (samples) | Cd/No = 50 dB-Hz | Cd/No = 51 dB-Hz | Cd/No = 52 dB-Hz | Cd/No = 53 dB-Hz | Cd/No = 54 dB-Hz |
|---|---|---|---|---|---|
| 0 | 0.175 | 0.285 | 0.410 | 0.524 | 0.635 |
| 1 | 0.102 | 0.134 | 0.163 | 0.168 | 0.162 |
| 2 | 0.029 | 0.028 | 0.024 | 0.014 | 0.006 |
| 3 | 0.010 | 0.0093 | 0.0051 | 0.0035 | 0.001 |
| 4 | 0.0059 | 0.0038 | 0.0028 | 0.00088 | 0.0005 |
| 5+ | 0.0042 | 0.0029 | 0.0016 | 0.00081 | 0.00020 |

TABLE 5

Probability of timing error when DSQM >0.1, Psample (P, 0.1, Cd/No)

| Timing Error P (samples) | Cd/No = 50 dB-Hz | Cd/No = 51 dB-Hz | Cd/No = 52 dB-Hz | Cd/No = 53 dB-Hz | Cd/No = 54 dB-Hz |
|---|---|---|---|---|---|
| 0 | 0.256 | 0.383 | 0.480 | 0.562 | 0.649 |
| 1 | 0.151 | 0.171 | 0.183 | 0.178 | 0.163 |
| 2 | 0.038 | 0.033 | 0.023 | 0.014 | 0.0053 |
| 3 | 0.012 | 0.0092 | 0.0048 | 0.0028 | 0.0011 |
| 4 | 0.0046 | 0.0030 | 0.0016 | 0.00088 | 0.00026 |
| 5+ | 0.0026 | 0.0015 | 0.00075 | 0.00038 | 0.0000900 |

TABLE 6

Probability of timing error when DSQM >0.15, Psample (P, 0.15, Cd/No)

| Timing Error P (samples) | Cd/No = 50 dB-Hz | Cd/No = 51 dB-Hz | Cd/No = 52 dB-Hz | Cd/No = 53 dB-Hz | Cd/No = 54 dB-Hz |
|---|---|---|---|---|---|
| 0 | 0.427 | 0.503 | 0.538 | 0.605 | 0.672 |
| 1 | 0.189 | 0.205 | 0.201 | 0.184 | 0.158 |
| 2 | 0.028 | 0.022 | 0.019 | 0.0094 | 0.0039 |
| 3 | 0.012 | 0.0043 | 0.00040 | 0.0012 | 0.00033 |
| 4 | 0.0014 | 0.0014 | 0 | 0 | 0 |
| 5+ | 0.00088 | 0.00025 | 0.00017 | 0.000052 | 0.000018 |

TABLE 7

Probability of timing error when DSQM >0.2, Psample (P, 0.2, Cd/No)

| Timing Error P (samples) | Cd/No = 50 dB-Hz | Cd/No = 51 dB-Hz | Cd/No = 52 dB-Hz | Cd/No = 53 dB-Hz | Cd/No = 54 dB-Hz |
|---|---|---|---|---|---|
| 0 | 0.477 | 0.565 | 0.550 | 0.609 | 0.701 |
| 1 | 0.215 | 0.199 | 0.203 | 0.188 | 0.147 |
| 2 | 0.031 | 0.016 | 0.021 | 0.0054 | 0.0027 |
| 3 | 0.0077 | 0 | 0 | 0.0011 | 0 |
| 4 | 0 | 0 | 0 | 0 | 0 |
| 5+ | 0.00012 | 0.000049 | 0.000019 | 0.0000085 | 0 |

The probability of a particular timing error when no signal is present is independent of thres, and is simply the uniform probability of selecting any one of the 135 sample timing offsets.

$$Psample(P, 0, 0) = \text{Psample\_no\_sig} = \frac{1}{135} \cong 0.0074$$

The probability that one DSQM quality measurement exceeds the threshold (Q>thres) for a given Cd/No is defined as P1(thres,Cd/No). This parameter is a function of thres and Cd/No as characterized through simulation; results are shown in Table 8.

TABLE 8

Probability of exceeding DSQM threshold, P1(thres, Cd/No)

| DSQM thres | No signal | Cd/No = 50 dB-Hz | Cd/No = 51 dB-Hz | Cd/No = 52 dB-Hz | Cd/No = 53 dB-Hz | Cd/No = 54 dB-Hz |
|---|---|---|---|---|---|---|
| 0.10 | 0.261 | 0.434 | 0.542 | 0.724 | 0.851 | 0.947 |
| 0.15 | 0.022 | 0.093 | 0.175 | 0.316 | 0.530 | 0.760 |
| 0.20 | 0.0015 | 0.016 | 0.040 | 0.103 | 0.232 | 0.470 |

Acquisition Using Multiple DSQM Measurements

The acquisition probability is the joint probability that a pair of peak indices (e.g., $P_U$ or $P_L$) is within D samples of each other, given that at least one quality measurement exceeds thres. This can be analyzed from the sample timing offset Psample data. For given values of thres and Cd/No, this probability is computed using the probabilities in Tables 3 through 7.

$$Pacq(D, thres, Cd/No) = 2 \cdot P1(thres, Cd/No) \cdot$$

$$(1 - P1(thres, Cd/No)) \cdot \sum_{P=-67}^{67} \left[ Psample(P, thres, 0) \cdot \sum_{d=-D}^{D} Psample(P+d, thres, Cd/No) \right] +$$

$$P1(thres, Cd/No)^2 \cdot \sum_{P=-67}^{67} \left[ Psample(P, thres, Cd/No) \cdot \sum_{d=-D}^{D} Psample(P+d, thres, Cd/No) \right]$$

The expression above indexes the sample timing data for Psample slightly above 67 samples and below −67 samples. In these cases there is a modulo wrap-around where sample 68 is equivalent to −67, and sample −68 is equivalent to 67. However, since the probability is uniform outside of ±4 samples, these values of Psample are held constant. So any index for Psample outside of ±4 has an index equivalent to P=5. Notice that Pacq does not guarantee that all acquisitions have an acceptable sample timing error, although the pair of timing P measurements is within D samples of each other. So the probability Pacq includes a small fraction of acquisitions where the sample timing error is faulty, leading to a "Badtrack" condition.

If the initial symbol timing error is greater than 3 samples, then the symbol tracking will likely converge to a faulty stable sample offset (about 27 samples error), resulting in a "Badtrack." The Badtrack condition sometimes occurs at low SNR when the error is 3 samples, and the symbol clock frequency error could also affect the probability of Badtrack. Therefore a more conservative condition requiring less than 3 samples timing error for proper tracking is analyzed. The probability of Badtrack is conditioned on passing the requirements for detecting acquisition, but the timing estimate error is outside of ±2 samples. The probability of Badtrack is expressed as $$Pbadtrack(D, thres, Cd/No) =$$

$$4 \cdot P1(thres, Cd/No) \cdot (1 - P1(thres, Cd/No)) \cdot$$

$$\sum_{P=3}^{67} \left[ Psample(P, thres, 0) \cdot \sum_{d=-D}^{D} Psample(P+d, thres, Cd/No) \right] +$$

$$2 \cdot P1(thres, Cd/No)^2 \cdot \sum_{P=3}^{67} \left[ Psample(P, thres, Cd/No) \cdot \sum_{d=-D}^{D} Psample(P+d, thres, Cd/No) \right]$$

Then the probability of a good acquisition where the timing falls within −2≤P≤2 is:

Pgoodacq(D,thres,Cd/No)=Pacq(D,thres,Cd/No)−Pbadtrack(D,thres,Cd/No).

Since Pbadtrack is generally much smaller than Pacq for the cases examined here, Pgoodacq is only slightly smaller than Pacq.

Figure 16:
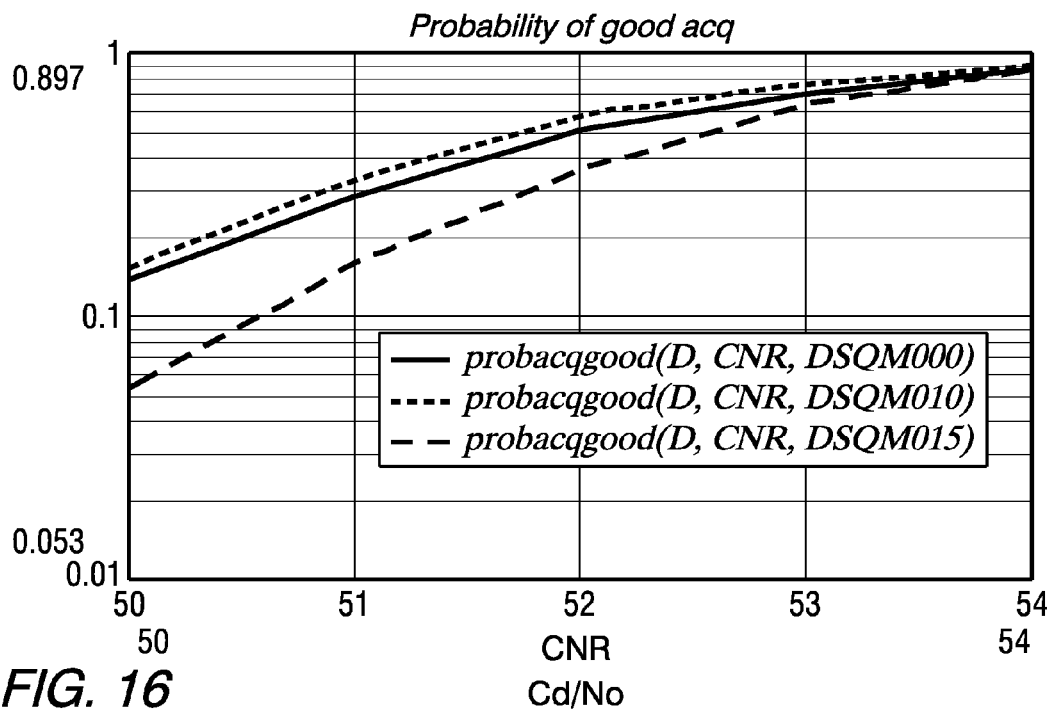
FIG. 16 shows the probability of a good acquisition.
Figure 17:
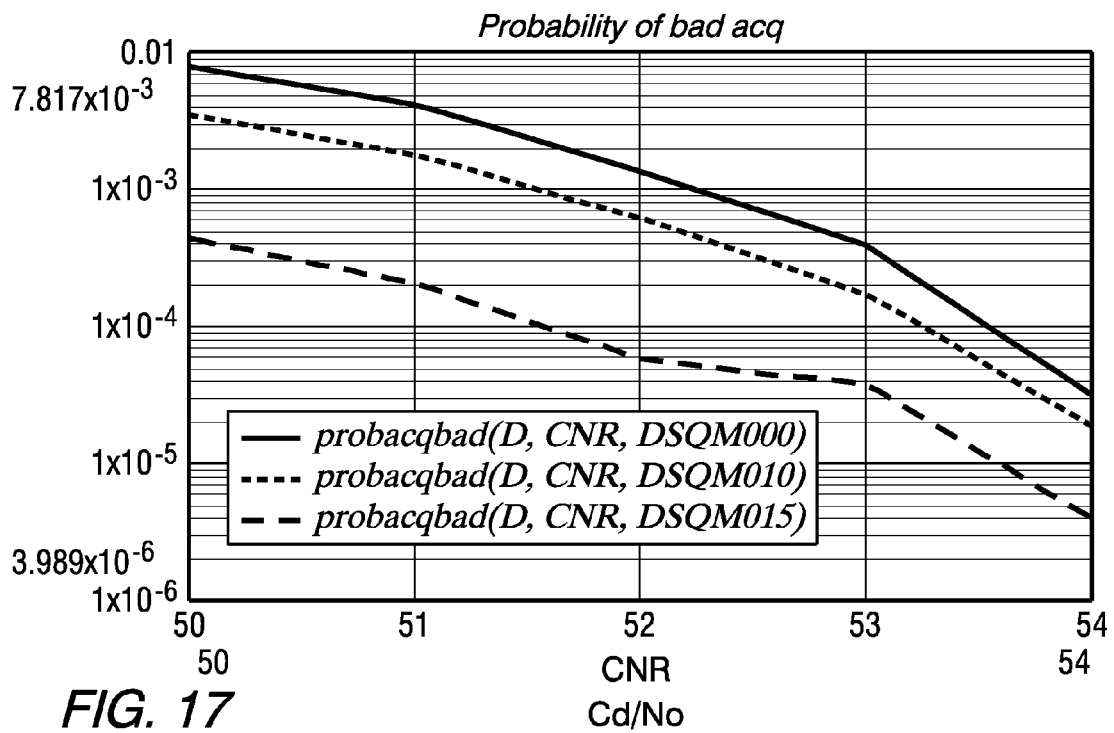
FIG. 17 shows the probability of a bad acquisition.

FIG. 16 shows the probability of a good acquisition where the DSQM timing error is P≤2 samples. FIG. 17 shows the probability of a bad acquisition where the DSQM timing error is P>2 samples.

The probability of false alarm occurs when no signal is present, at least one of the pair of DSQM quality measurements exceeds the threshold, and ΔP≤D. This is equivalent to the expression for Pacq when no signal is present.

$$Pfalsealarm(D, thres) = \lim_{Cd/No \rightarrow 0} Pacq(D, thres, Cd/No)$$

which can also be expressed as:

$$Pfalsealarm(D, thres) = (1 - [1 - P1(thres, 0)^2]) \cdot \frac{2 \cdot D + 1}{135}$$

TABLE 9

Probability of false alarm (ΔP ≤ D) with no signal,

| | Pfalsealarm (D, thres) | |
|---|---|---|
| thres | D = 1 | D = 2 |
| 0.00 | 0.022 | 0.037 |
| 0.10 | 0.010 | 0.017 |
| 0.15 | 0.001 | 0.0016 |
| 0.20 | 0.000067 | 0.00011 |

Temporal Consistency

The temporal consistency check is intended for acquisition of a signal where one sideband is severely corrupted. The corrupted sideband is assumed to yield an unreliable symbol timing offset value P, so the ΔP≤D condition is unlikely to be satisfied. The DSQM decision rule requires a timing consistency within ΔP≤D samples for a pair of DSQM measurements. This pair of DSQM measurements normally consists of the upper and lower sideband values. However, if this consistency is not met for the pair of sidebands, then the next pair of DSQM samples is also used to check for temporal consistency on the same sideband. Furthermore, this temporal consistency requires only the most recent DSQM value to exceed the threshold, while the previous value on the same sideband must be within ±D samples. There is no requirement that the previous value exceeds the threshold. This temporal consistency condition will tend to increase all the acquisition probabilities (Pacq, Pbadtrack, Pgoodtrack and Pfalsealarm), especially for low values of Cd/No. For low Cd/No in AWGN, these probabilities are expected to nearly double due to the temporal consistency check. The doubling can be explained by allowing an extra check for ΔP≤D on the same sideband in addition to the alternate sideband. For low Cd/No, only one sideband is likely to exceed the threshold. Then the probability of a false alarm, including the temporal consistency check, is modified to approximately $$Pfalsealarm(D, thres) = 2 \cdot (1 - [1 - P1(thres, 0)^2]) \cdot \frac{2 \cdot D + 1}{135}$$

Table 10 is similar to Table 9, except the probability of false alarm includes the temporal consistency check.

TABLE 10

Probability of false alarm (ΔP ≤ D) with temporal consistency, no signal,

| | Pfalsealarm (D, thres) | |
|---|---|---|
| thres | D = 1 | D = 2 |
| 0.00 | 0.044 | 0.074 |
| 0.10 | 0.020 | 0.034 |
| 0.15 | 0.002 | 0.0032 |
| 0.20 | 0.000134 | 0.00022 |

Frame Synchronization Analysis

Frame synchronization is described here as a two-step process: Initial Subframe Found, followed by Subframe Lock. This process starts after a successful DSQM detection identifies the symbol timing offset, and the symbol-synchronized OFDM demodulation commences. However, if an Initial Subframe is not detected after a predetermined time following DSQM acquisition, then a reacquisition must be initiated to prevent sample timing drift caused by clock frequency error.

To detect the Initial Subframe, the receiver performs a sliding correlation over all the OFDM subcarriers and the received OFDM symbols. The correlation is for an 11-bit sync pattern spread over a 32-symbol Subframe in all of the Reference Subcarriers. A subcarrier correlation is declared when all 11 sync bits match the sync pattern for that subcarrier. Initial Subframe Found is declared when correlation is successful on a predetermined number of subcarriers spaced a multiple of 19 subcarriers apart, and on the same 32-bit subframe. When Initial Subframe Found occurs, the 32-bit subframe boundaries are established, as well as the location of the Reference Subcarriers. If the Subframe is not found after a predetermined time after DSQM acquisition, then this process is terminated, and a reacquisition is initiated.

Subframe Lock is established when another predetermined number of subcarrier correlations occurs on the established Reference Subcarriers, and are spaced from the Initial Subframe Found by an integer multiple of 32 symbols. If the symbol tracking is initiated immediately after Initial Subframe Found, then it may not be necessary to place a time limit on Subframe Lock before a reacquisition. This is because further symbol timing drift is prevented by symbol tracking.

The following analysis characterizes the probabilities associated with Initial Subframe Found and Subframe Lock. This can be combined with the DSQM analysis to determine the probabilities of successful acquisition, faulty acquisition, and estimates of the time required for Subframe Lock.

First compute correlation probability on one subcarrier with 11 sync bits. Because of the possibility of large phase errors due to initial symbol error (before symbol tracking converges), one must consider the 4 possible phases of the signal (I, Q and complements) for correlation possibilities. Note that this 4-phase detection method may introduce other error conditions when 2 phases straddle the boundary. This probability is approximated by:

$$P\text{sync}(BER)=1-[1-(1-BER)^{11}]\cdot(1-BER^{11})\cdot(1-0.5^{11}),$$

where the probability of bit error (BER) for differentially detected BPSK, or DBPSK is $$BER = -\frac{1}{2} \cdot e^{-Eb/No}.$$

For the BPSK reference subcarrier of the IBOC signal, the relationship between Eb and Cd in dB is:

$$Eb_{dB} = Cd_{dB} - 51 \text{ dB}.$$

The quantity Cd/No is expressed in units of dB_Hz. Then the BER can be expressed as a function of Cd/No.

$$BER = -\frac{1}{2} \cdot e^{-10^{[(Cd/No-51)/10]}}$$

In order to compute the probability of Initial Subframe Found and Subframe Lock, some intermediate probabilities are computed. The probability that a successful correlation occurs on Nsc subcarriers, given that the Primary reference subcarriers are already identified, and are synchronized to the Subframe boundary is:

$$Psf(Nsc, BER) = \sum_{n=Nsc}^{22} \left( \frac{22!}{n! \cdot (22-n)!} \cdot Psync(BER)^n \cdot [1 - Psync(BER)^{22-n}] \right).$$

The probability Psf is also the conditional probability of Subframe Lock in any one Subframe time (32 symbol period), given that Initial Subframe Found is successful.

Allowing for all 19 possible Reference Subcarrier offsets in a partition, and for all 32 symbol possibilities in a Subframe, the average probability of Initial Subframe Found over every 32-symbol shift of a subframe is:

$$P\text{found}(Nsc, BER) = 1 - [1 - Psf(Nsc, BER)] \cdot [1 - Psf(Nsc, 0.5)]^{19 \cdot 32 - 1}$$

Figure 19:
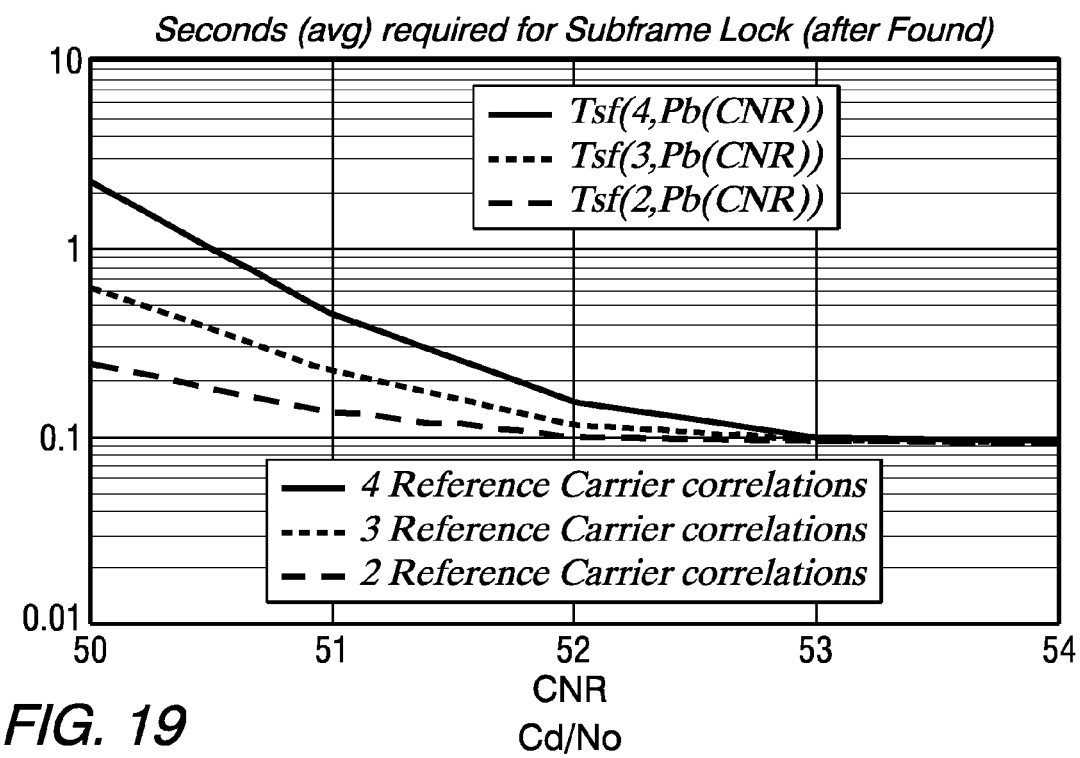
FIG. 19 is a plot of bit error rate.

The average time (seconds) required for Initial Subframe found, given that the signal is acquired and no reacquisitions are allowed, can be computed as:

$$T\text{found}(Nsc, BER) = \frac{32}{fsym \cdot P\text{found}(Nsc, BER)}.$$

where fsym is the OFDM symbol rate. The plot of FIG. 19 shows Tfound(Nsc,BER) for Reference Subcarrier correlation thresholds of 4, 3, and 2 over a range of Cd/No.

Figure 18:
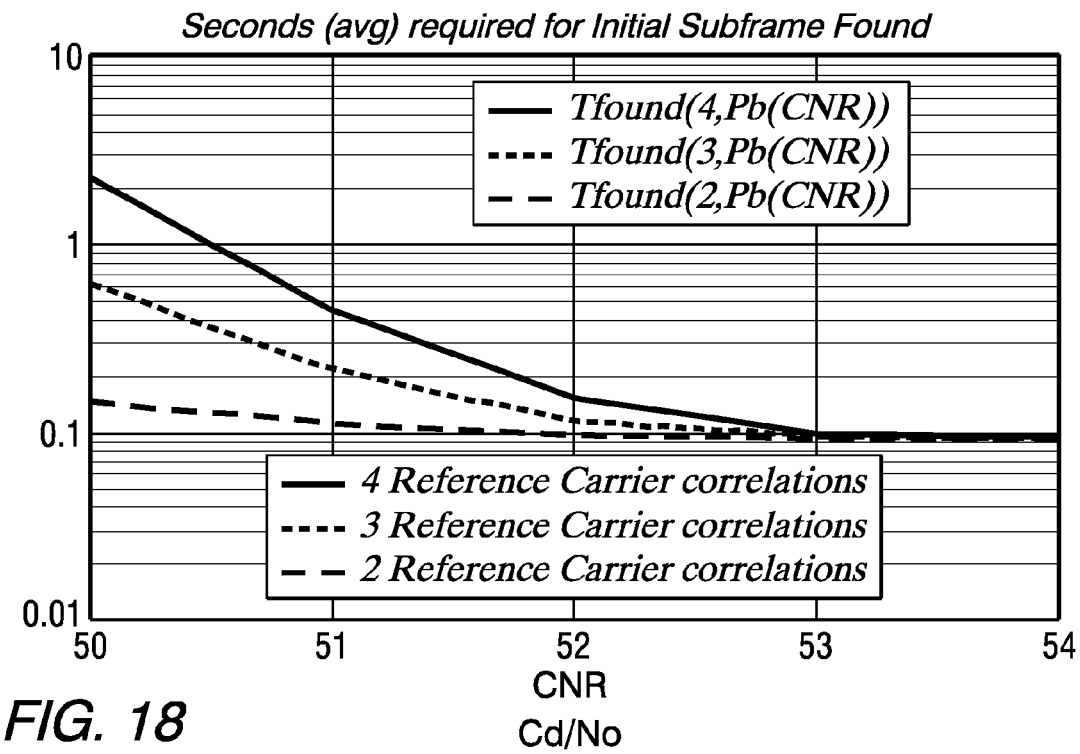
FIG. 18 is a plot showing the average time required for subframe lock.

FIG. 18 is a plot showing the average time required for Subframe lock after Initial Subframe found. This assumes no reacquisitions.

The average time (seconds) required for Subframe Lock, given Initial Subframe Found, can be computed as:

$$Tsf(Nsc, BER) = \frac{32}{fsym \cdot Psf(Nsc, BER)}.$$

The plot of FIG. 19 shows Tsf(Nsc,BER) for Reference Subcarrier correlation thresholds of 4, 3, and 2 over a range of Cd/No.

The probability of Initial Subframe found over the allotted Nsf1 Subframe periods to find the sync pattern is:

$$P\text{found}Nsf(Nsc1, BER, Nsf1) = 1 - (1 - P\text{found}(Nsc1, BER))^{Nsf1}.$$

The probability of Subframe Lock over the allotted Nsf2 Subframe periods is:

$$PlockNsf(Nsc2, BER, Nsf2) = 1 - (1 - Psf(Nsc2, BER))^{Nsf2}.$$

Selection of Parameter Values for Frame Sync

Based on the probability analyses in the previous sections, the following parameter values are recommended:

D=1 Sample offset difference (ΔP≤D) permitted thres=0.1 DSQM quality threshold for acquisition Nsc1=3 Number of sync correlations required for Initial Subframe Found Nsc2=2 Number of sync correlations required for Subframe Lock Nsf1=4 Number of Subframes for Initial Subframe Found before reacq Nsf2=4 Number of Subframes for Subframe Lock before reacq False Acquisition and Subframe Lock Rate It was shown in the DSQM analysis that the probability of false DSQM acquisition (with no signal) Pfalsealarm is approximately 0.02 (thres=0.1, D=1, including temporal consistency check) for every 16-symbol period. Then the average time between false DSQM acquisitions is:

$$TfaDSQM = \frac{16}{fsym \cdot Pfalsealarm(1,0.1)} = 2.3 \text{ seconds}.$$

The probability of Initial Subframe Found (no signal) within the 4 Subframes allotted is:

$$P\text{found}Nsf(3,0.5,4) = 0.027.$$

The time period allotted (Nsf Subframes) for Initial Subframe Found is:

$$TNsf(Nsf) = \frac{32 \cdot Nsf}{fsym};$$

and $$TNsf(4) = 0.372 \text{ seconds}.$$

The average time required for faulty Initial Subframe Found, given a faulty DSQM acquisition (BER=0.5) is:

$$TfoundNsf(Nsc1, Nsf1) = \frac{TNsf(Nsf1) + TfaDSQM}{PfoundNsf(Nsc1, 0.5, Nsf1)}$$

$$TfoundNsf(3, 0.5, 4) = 100 \text{ seconds}.$$

The probability of faulty Subframe Lock over the allotted Nsf=4 Subframes, given a faulty Initial Subframe found, is:

$$PlockNsf(2, 0.5, 4) = 3.4 \cdot 10^{-3}.$$

The time period allotted (Nsf Subframes) for Subframe Lock in this case is the same as for Initial Subframe Found:

$$TNsf(4) = 0.372 \text{ seconds}.$$

The average time required for faulty Subframe Lock, given a faulty DSQM acquisition (BER=0.5) and faulty Initial Subframe Found is:

$$TlockNsf(Nsf2, Nsf2) = \frac{TfoundNsf(Nsc2, 0.5, Nsf2) + TfaDSQM}{PlockNsf(Nsc2, 0.5, Nsf2)}$$

$$TlockNsf(3, 0.5, 4) = 29,329 \text{ seconds, or about 8 hours}.$$

Then false Subframe Lock occurs about once in 8 hours with no signal present. However, it is also assumed that symbol tracking doesn't result in a false lock, which is influenced by the sample clock error (e.g., up to 100 ppm). A combination of large clock error and initial sample offset error from DSQM could result in a false lock in symbol tracking, or "Badtrack". A means of detecting Badtrack should be implemented.

VII. DSQM-Lite for Badtrack Detection

A Badtrack detection method is needed to prevent the demodulator from remaining in a stuck condition while outputting faulty branch metrics. Badtrack is the result of the symbol tracking being stuck at a faulty sample offset (e.g. 27 samples error). This is due to a 2-π phase shift (instead of 0) between adjacent Reference Subcarriers. The Badtrack is especially important in an MRC diversity receiver where each demodulator can operate at a lower SNR, and contamination of one demodulator in a Badtrack state to the other demodulator is possible. A reacquisition is invoked when a Badtrack is detected. The existing fourth-power Badtrack detection method is unreliable for Cd/No<54 dB_Hz. However a DSQM_lite-based detection method is more reliable, and is described here. The DSQM_lite function provides periodic digital signal quality metrics (every 16 or 32 symbols), but requires fewer MIPS than the original DSQM function. Fewer MIPS are needed because it exploits knowledge of the location of the cyclic prefix region after initial acquisition.

Assume DSQM_lite samples are available every 16-symbol period. These can be filtered with a unity-gain lossy integrator with a time constant of about 8 samples. At the start of DSQM_lite filtering, the filter memory DSQM_lite_filt should be initialized to DSQM_lite_filt_init (e.g., 0.08), which is between the two threshold values for Badtrack detection and low signal suppression described later in this section. The filter initialization (instead of zero) reduces the initial period when a good signal is suppressed due to filter time constant. The DSQM_lite IIR filter is a unity-gain lossy integrator with a time constant of about 8 DSQM_lite samples (128 symbols). The filter expression is:

$$DSQM\_lite\_filt_n = 0.875 \cdot DSQM\_lite\_filt_{n-1} + 0.125 \cdot DSQM\_lite_n.$$

Branch metrics can be suppressed (zeroed) when DSQM_lite_filt<thres_nosig. (e.g., thres_nosig=0.1) The DSQM_lite_filt value approaches approximately 0.15 for Cd/No=51 dB_Hz, the minimum expected operating value.

if DSQM_lite_filt$_n$<thres_nosig; then ZERO all Branch metrics.

A counter is incremented when the filtered DSQM_lite_filt<thres_badtrack (e.g., thres_badtrack=0.06). This threshold value offers sufficient margin for Badtrack detection since DSQM_lite_filt approaches approximately 0.03 in a Badtrack condition or when no signal is present. This should be effective in preventing contamination to the alternate demodulator in the MRC case.

Reacquisition is invoked when the counter indicates a sufficiently long duration. The counter is initialized to zero at DSQM acquisition, and reset to zero whenever the filtered DSQM_lite_filt≥thres_badtrack.

$$Badtrack\_count_n = \begin{cases} Badtrack\_count_{n-1} + 1; & \text{if } DSQM\_lit\_filt_n < thres\_badtrack \\ 0; & \text{otherwise} \end{cases}$$

if Badtrack_count$_n$>100, then invoke reacquisition (about 4.6 sec)

Figure 20:
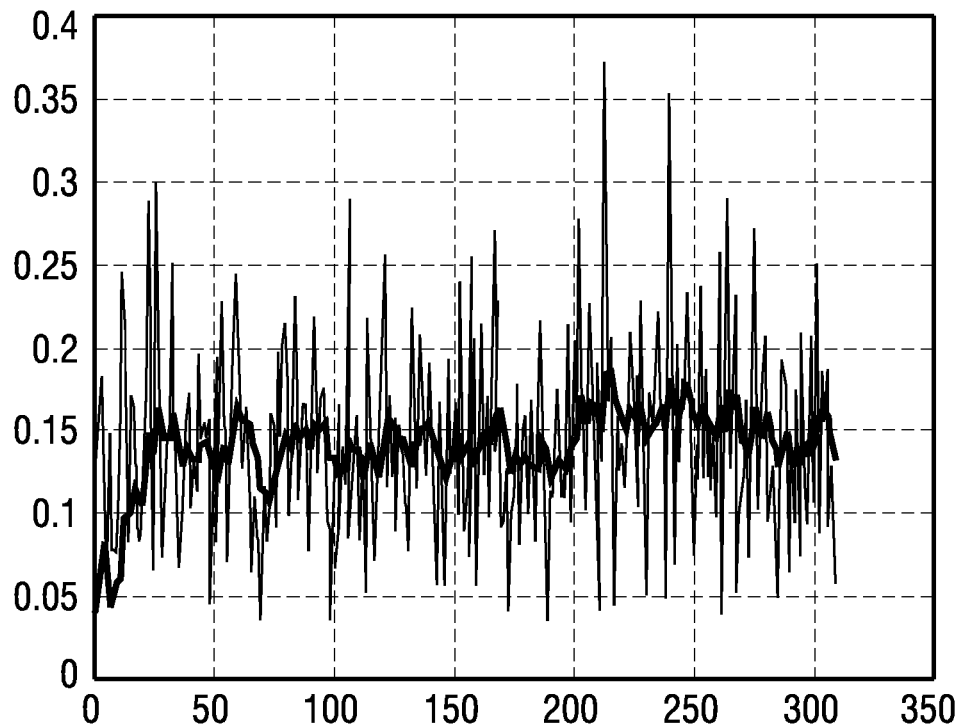
FIGS. 20 through 24 are plots of a digital signal quality metric.
Figure 21:
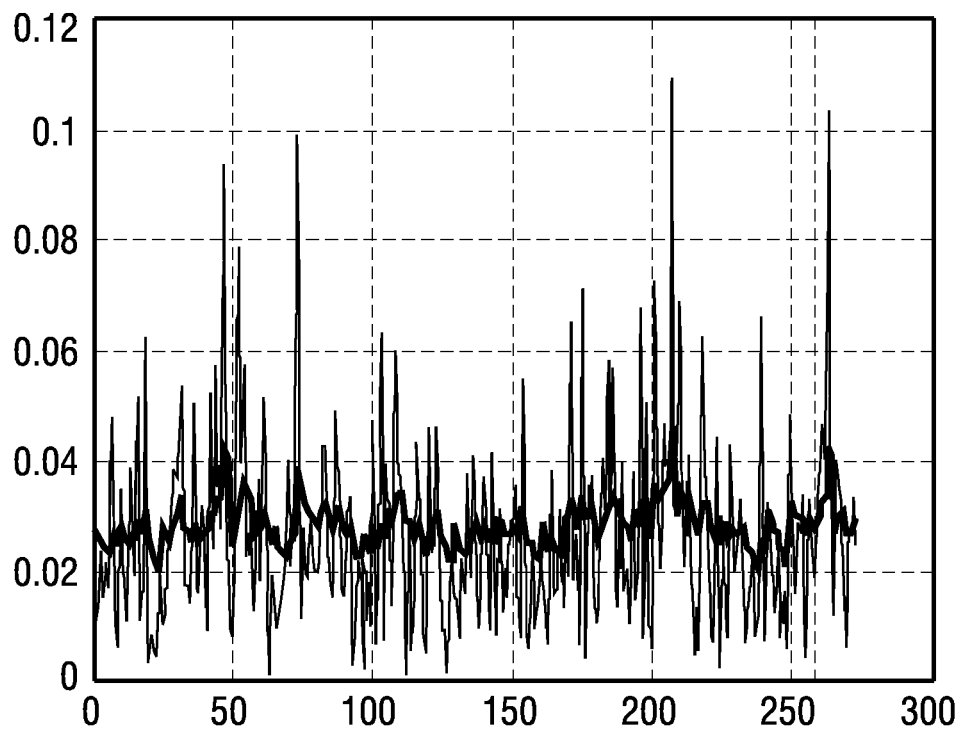

FIG. 20 shows a plot of DSQM_lite_filt versus time (in DSQM periods) for Cd/No=51 dB_Hz. The horizontal axis units are in DSQM samples, where each sample spans 16 symbols (46.5 msec). The average value approaches about 0.15 in this case. FIG. 21 shows a plot of DSQM_lite_filt versus time (in DSQM periods) for no signal present (noise only). The average value approaches about 0.03 when no signal is present. The horizontal axis units are in DSQM samples, where each sample spans 16 symbols (46.5 msec).

Figure 22:
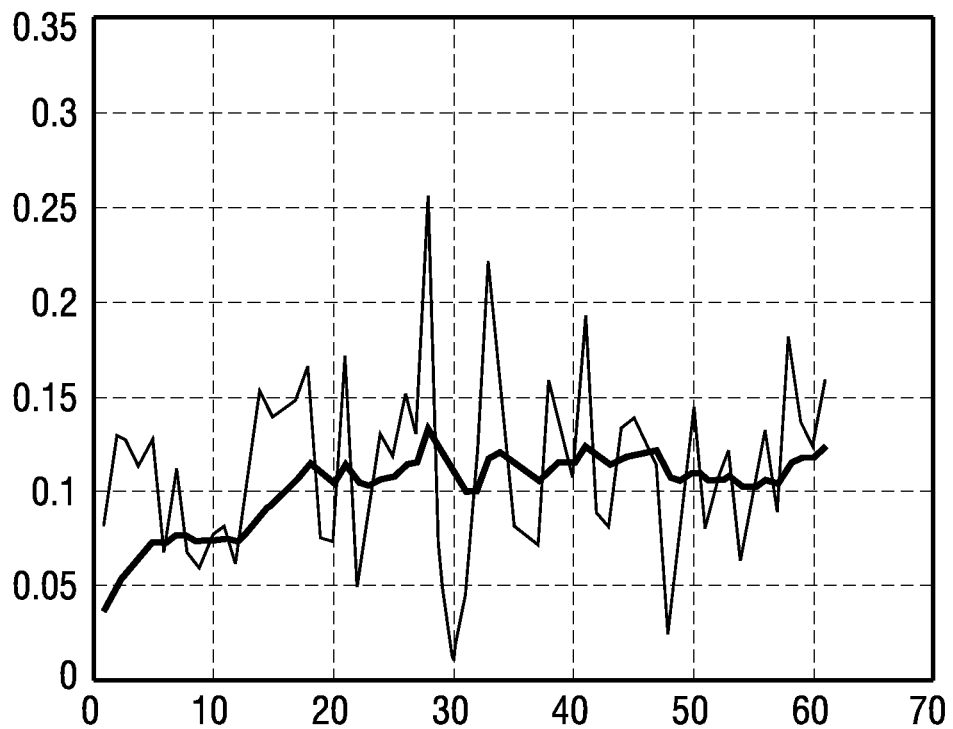
Figure 23:
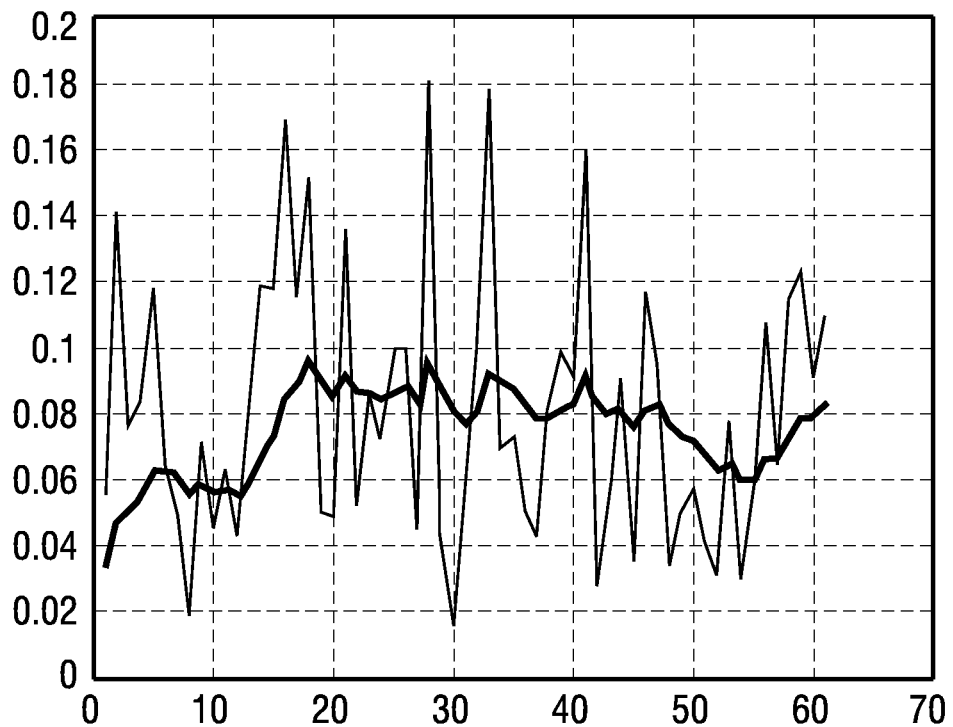
Figure 24:
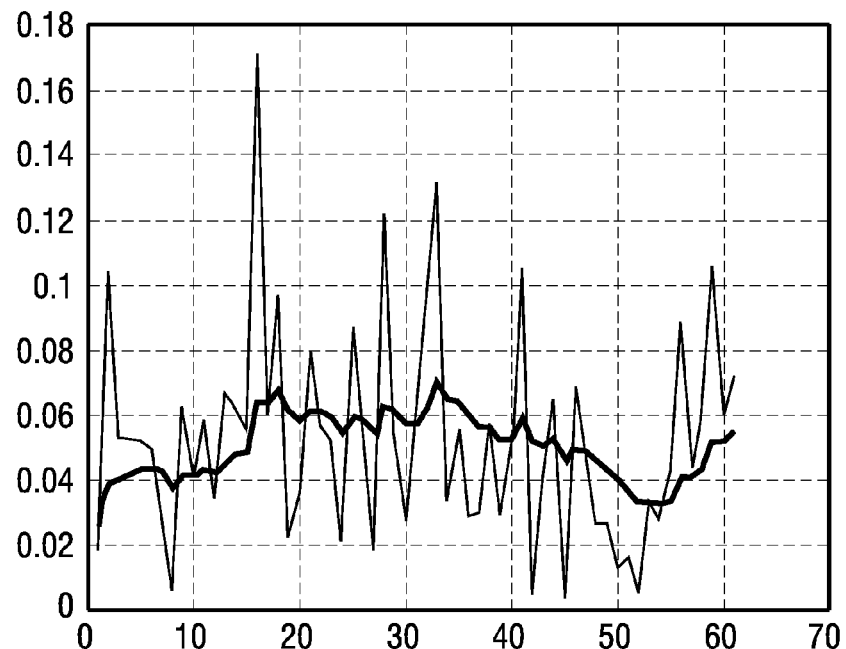

FIGS. 22 through 24 show DSQM_lite_filt at 51 dB_Hz with different values of symbol timing error. The symbol tracking was disabled in these cases, and the symbol timing error was held constant. The degradation due to symbol timing error can be assessed by comparing the DSQM_lite_filt value to FIG. 20. FIG. 20 shows that the DSQM_lite_filt approaches approximately 0.15 when no sample error is present. FIGS. 22 through 24 show that the DSQM_lite_filt approaches approximately 0.12, 0.08 and 0.05 with sample offset errors of 4, 8, and 12 samples, respectively, at 540 samples/symbol. The BER (after FEC decoding) measured at 8 samples offset is approximately 0.5 for a single (non-MRC) modem, indicating that the branch metrics may provide insignificant improvement for MRC combining. That is why the DSQM_lite_filt threshold for branch metric suppression is set at the particular value of thres_nosig.

VIII. Implementation Considerations

Since the pair of digital demodulators may not be in the same state (e.g. reacq, frame sync, valid branch metrics) at the same time, an arbitration scheme must be developed. One possibility is that both digital demodulators (D0 and D1) operate mostly autonomously from each other. The first demod to reach Subframe Lock shall coordinate operations (master) for combining branch metrics, and downstream (deinterleaving, decoding, etc.). Branch metrics can be combined from alternate demods when available. It is assumed that the demodulation process is multiplexed by alternating symbol processing for the pair of demodulators. Then only one demodulator at a time will change the state. Transitions between states can be initiated either by a reacquisition (re-acq) or a Subframe Lock (SFLock). Each demodulator can be in only one of two modes, SYNC or DECODE. For each demodulator the SYNC mode is entered by a reacq, and the DECODE mode is entered by a SFLock.

Figure 25:
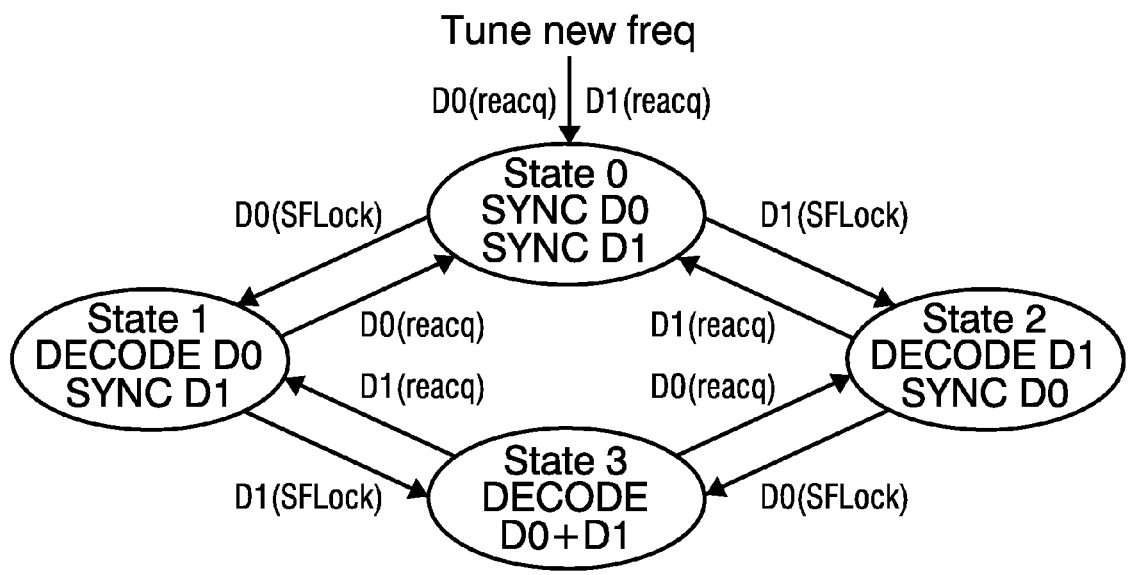
FIG. 25 is a state diagram for MRC coordination and arbitration.

FIG. 25 is a state diagram for MRC coordination and arbitration. There are 4 possible states for the MRC Arbitration State diagram shown in FIG. 25. The state is determined by the pair of demodulator modes.

The downstream functions (deinterleaving, decoding, etc.) are initialized in State 0. Upon entering State 0, the deinterleaver is not receiving symbols from either of the demodulators, since they are both in SYNC mode. The first demodulator to establish Subframe Lock initiates the downstream functions. The last demodulator to enter SYNC mode disables the downstream functions.

The described acquisition and tracking modifications will allow more reliable acquisition and tracking at lower SNRs to aid MRC performance. Reducing DSQM threshold from 0.2 to 0.1 will improve acquisition time at low SNR.

All fourth-power-based processing has been eliminated, including symbol tracking and bad-track detection/reacquisition control.

The symbol tracking algorithm is disabled until Initial Subframe Found. The symbol sample offset correction determined by DSQM is maintained. The sample timing may drift due to the difference in transmitter and receiver clocks (e.g., 100 ppm will drift 18.6 samples/second at 186 ksps). The symbol tracking is intended to prevent further sample error drift after Initial Subframe Found. One sample at a time is corrected. The receiver allows the sample slip to drift for a limited time until it is out of symbol tracking range. If it drifts any longer then a reacquisition is performed.

Before Initial Subframe Found, the symbol tracking loop input and symbol tracking SNR should be 0. After Initial Subframe Found, symbol tracking on reference subcarriers can begin.

Filtered sync weights can be used immediately upon starting the symbol tracking loop. All canned weights (4$^{th}$ power and pilot) can be deleted. Initializing sync weights to canned weights instead of zero can be considered.

The fast-track period, with the symbol tracking loop gain collapsing from 0.2 to 0.02, can also start immediately after Initial Subframe Found. It can remain 400 symbols long. However, other actions previously performed during fast-track are deleted. Since tracking on pilots, the symbol tracking error input is scaled by $\frac{1}{19}$. The symbol tracking error input is clipped to ±1 (it was previously clipped to ±5 during fast-track). The SNR-based flywheel gain shall be set to 1 during the fast-track period (until proportional gain=0.02).

Disable all SNR-based reacquisition conditions. Note that SNR=0 until 21 symbols after Init Subframe Found. In Initial Subframe Detection state, remove reacq if SNR<0.1 and no subframes detected within 100 symbols. In Subframe Verification state, remove reacq if 125 symbols have been processed since entering this state, and SNR<0.1.

The rules for determining Subframe Found and Lock have been modified. The Initial Subframe Found requires only three 11-bit sync correlations spaced by 19 subcarriers. If not detected within 128 symbols (4 Subframe periods) after successful DSQM, then perform a reacquisition. The Subframe Lock checks only the identified reference subcarriers from initial subframe correlation at multiples of the 32-symbol spacing.

Only the current subframe spacing needs to be checked against the initially detected subframe, not all previously detected subframes. The 32-subframe array can be removed.

The second subframe requires only two 11-bit sync correlations. If Subframe lock is not established within 128 symbols (4 Subframes) after Initial Subframe Found, then perform a reacquisition.

The Reference Subcarrier ID (coarse bin offset) can be checked for consistency between the Initial Subframe Found and $2^{nd}$ detected subframe, before declaring Subframe Lock. A reacquisition can be performed if the Reference Subcarrier IDs are different.

Bad-track detection can be implemented using IIR-filtered DSQM_lite_filt, replacing fourth-power bad-track detection. A reacquisition can be invoked when bad-track is detected.

DSQM can be calculated every 16 symbols. IIR can be a single pole unity-gain lossy integrator with alpha=⅛. Filter can be initialized to DSQM_lite_filt_init (e.g., 0.03 to 0.08).

A counter can be incremented when the filtered DSQM_lite_filt<thres_badtrack (e.g., 0.06). A reacquisition can be invoked when the counter exceeds 100 DSQM periods (1600 symbols). The counter can be reset to 0 when filtered DSQM-lite exceeds thres_badtrack. The timeout after Subframe lock may be increased.

Whenever the filtered DSQM_lite_filt<thres_nosig (e.g., 0.6≤thres_nosig≤0.1), all branch metrics can be zeroed. The only original Synchronization Control Reacq condition that remains is the 648-subframe (one minute) timeout in the Subframe Lock state.

The other mode fields (similar to Reference Subcarrier ID) between the Initial Subframe Found and Subframe Lock can be checked for consistency and a reacquisition can be performed if they are inconsistent.

While the invention has been described in terms of various embodiments, it will be apparent to those skilled in the art that numerous changes can be made to the disclosed embodiments without departing from the scope of the claims set forth below. For example, those skilled in the art will understand that the functions and processes described herein can be implemented using known circuit components and/or one or more processors programmed to perform the functions or processes.

What is claimed is:

1. A method for processing a radio signal comprising:
   receiving a signal on two antennas;
   demodulating the signal using first and second independent signal paths that are synchronized by symbol number;
   maximum ratio combining branch metrics from the two receiver paths; and
   using the combined branch metrics to produce an output, wherein a first one of the first and second independent signal paths to reach Subframe Lock coordinates operations for maximum ratio combining the branch metrics and downstream operations.

2. The method of claim 1, wherein the first and second signal paths adjust the magnitudes of the first and second branch metrics in response to a signal-to-noise ratio of the signal in the first and second signal paths.

3. The method of claim 1, wherein the maximum ratio combining step sums corresponding, synchronized branch metrics from the first and second independent signal paths.

4. The method of claim 1, wherein when one of the signal paths has no branch metrics available, the branch metrics of that signal path are zeroed.

5. A method for processing a radio signal comprising:
receiving a signal on two antennas;
demodulating the signal using first and second independent signal paths that are synchronized by symbol number;
maximum ratio combining branch metrics from the two receiver paths; and
using the combined branch metrics to produce an output, wherein the first and second independent signal paths each include a demodulator and only one of the demodulators at a time changes its state.

6. The method of claim 5, wherein transitions between states is initiated either by a reacquisition or a Subframe Lock.

7. The method of claim 5, wherein each of the demodulators can be in only one of two modes, SYNC or DECODE.

8. The method of claim 7, wherein the SYNC mode is entered by a reacquisition, and the DECODE mode is entered by a Subframe Lock.

9. A receiver comprising:
first and second inputs configured to receive a signal on two antennas; and
first and second demodulators for demodulating the signal in first and second independent signal paths that are synchronized by symbol number; and
circuitry for maximum ratio combining branch metrics from the two signal paths, and using the combined metrics to produce an output, wherein a first one of the first and second independent signal paths to reach Subframe Lock coordinates operations for maximum ratio combining the branch metrics, and downstream operations.

10. The receiver of claim 9, wherein the first and second signal paths adjust the magnitudes of the first and second branch metrics in response to a signal-to-noise ratio of the signal in the first and second signal paths.

11. The receiver of claim 9, wherein the maximum ratio combining sums corresponding, synchronized branch metrics from the first and second independent signal paths.

12. The receiver of claim 9, wherein when one of the signal paths has no branch metrics available, the branch metrics of that signal path are zeroed.

13. A receiver comprising:
first and second inputs configured to receive a signal on two antennas; and
first and second demodulators for demodulating the signal in first and second independent signal paths that are synchronized by symbol number; and
circuitry for maximum ratio combining branch metrics from the two signal paths, and using the combined metrics to produce an output, wherein only one of the demodulators at a time changes its state.

14. The receiver of claim 13, wherein transitions between states is initiated either by a reacquisition or a Subframe Lock.

15. The receiver of claim 13, wherein each of the demodulators can be in only one of two modes, SYNC or DECODE.

16. The receiver of claim 15, wherein the SYNC mode is entered by a reacquisition, and the DECODE mode is entered by a Subframe Lock.

* * * * *